United States Patent
Oami et al.

(10) Patent No.: US 9,342,770 B2
(45) Date of Patent: May 17, 2016

(54) EQUIPMENT CONTROL DEVICE, EQUIPMENT CONTROL SYSTEM, AND EQUIPMENT CONTROL METHOD

(75) Inventors: Ryoma Oami, Tokyo (JP); Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 174 days.

(21) Appl. No.: 14/115,468

(22) PCT Filed: Apr. 27, 2012

(86) PCT No.: PCT/JP2012/061787
§ 371 (c)(1),
(2), (4) Date: Nov. 4, 2013

(87) PCT Pub. No.: WO2012/153743
PCT Pub. Date: Nov. 15, 2012

(65) Prior Publication Data
US 2014/0098397 A1    Apr. 10, 2014

(30) Foreign Application Priority Data

May 9, 2011   (JP) .................................. 2011-104296

(51) Int. Cl.
*G06K 15/00* (2006.01)
*G06Q 10/06* (2012.01)
*H04L 12/28* (2006.01)
(52) U.S. Cl.
CPC ............ *G06K 15/4055* (2013.01); *G06Q 10/06* (2013.01); *H04L 12/2829* (2013.01)
(58) Field of Classification Search
USPC ........................................................ 358/1.1
See application file for complete search history.

(56) References Cited

U.S. PATENT DOCUMENTS

2007/0182818 A1* 8/2007 Buehler ......................... 348/143

FOREIGN PATENT DOCUMENTS

| JP | 2001-008197 | 1/2001 |
| JP | 2001-063186 | 3/2001 |

(Continued)

OTHER PUBLICATIONS

Takehisa et al., Remote Managemnet System of Building Equipment, Feb. 4, 2010, Machine Translated Japanese Patent Application Publication, JP2010-026956, all pages.*

(Continued)

*Primary Examiner* — Ngon Nguyen
(74) *Attorney, Agent, or Firm* — Wilmer Cutler Pickering Hale and Dorr LLP

(57) ABSTRACT

Provided is an equipment control device capable of performing more appropriate equipment control in accordance with detection by a user.

The present invention includes: an equipment layout information storage unit for storing equipment layout information including positional information of control-target equipment to be controlled within a managed space; related ID information storage unit for storing related ID information representing the correspondence relationship between the control-target equipment and IDs given to users of the control-target equipment; an ID-affixed motion line information acquisition unit for acquiring ID-affixed motion line information, in which the ID of a user is associated with the time series of the positional information of the user in the managed space; and an equipment controller for acquiring, on the basis of the related ID information, the control-target equipment associated with the ID in the ID-affixed motion line information, generating control information for controlling, on the basis of the ID-affixed motion line information and equipment layout information, the state of the control-target equipment, and outputting the control information to the control-target equipment.

19 Claims, 18 Drawing Sheets

(56) References Cited

FOREIGN PATENT DOCUMENTS

| | | |
|---|---|---|
| JP | 2002-049538 | 2/2002 |
| JP | 2002-157040 | 5/2002 |
| JP | 2004-288004 | 10/2004 |
| JP | 2007-184738 | 7/2007 |
| JP | 2009-169543 | 7/2009 |
| JP | 2009-174830 | 8/2009 |
| JP | 2009-265972 | 11/2009 |
| JP | 2010-026956 | 2/2010 |
| JP | 2010-176563 | 8/2010 |
| JP | 2010-197194 | 9/2010 |
| JP | 2011-018002 | 1/2011 |
| WO | WO-2011/001679 | 1/2011 |
| WO | WO-2011/027883 | 3/2011 |

OTHER PUBLICATIONS

International Search Report corresponding to PCT/JP2010/061787, dated May 30, 2012, 5 pages.

* cited by examiner

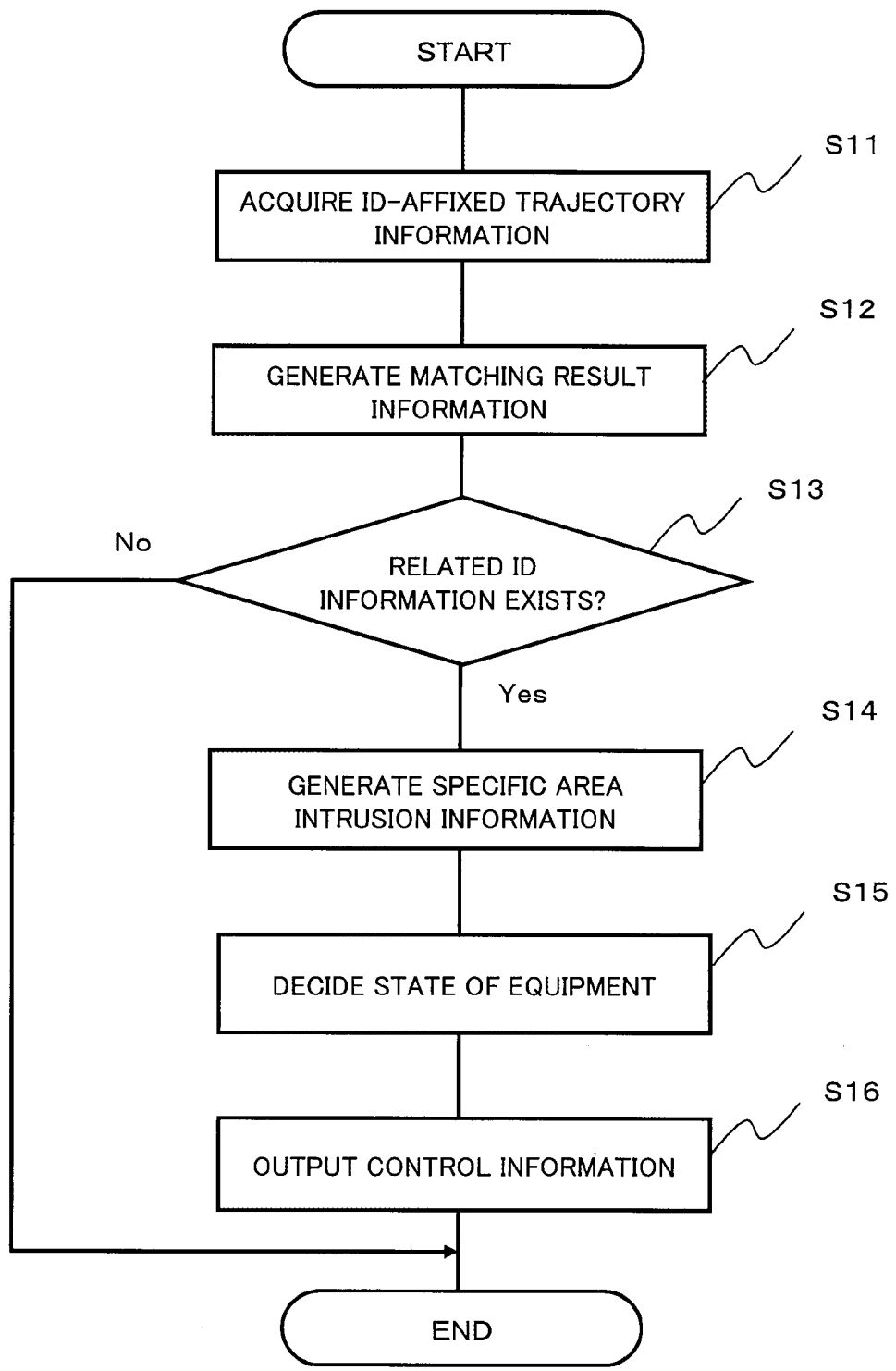

EQUIPMENT CONTROL DEVICE, EQUIPMENT CONTROL SYSTEM, AND EQUIPMENT CONTROL METHOD

CROSS-REFERENCE TO RELATED APPLICATIONS

This application is a national stage application of International Patent Application No. PCT/JP2012/061787, filed on Apr. 27, 2012, and which claims the benefit of the priority of Japanese Patent Application No. 2011-104296, filed on May 9, 2011, the contents of which are incorporated herein by reference in their entirety.

FIELD OF THE INVENTION

The present invention relates to an equipment control device which controls equipment, and in particular, relates to an equipment control device, an equipment control system and an equipment control method which control equipment in accordance with detection of a user in a space of management target.

BACKGROUND OF THE INVENTION

An equipment control device which controls equipment in accordance with detection of a user in a space of management target is known. As such equipment control device, for example, a device which controls ON/OFF of a printer device using a person sensor is known (for example, refer to patent document 1). The device described in patent document 1 makes a power supply of the printer device to ON state when an output of the person sensor is high. And, when the output of the person sensor becomes low, this device confirms whether it is in printing operation, and causes the power supply of the printer device to OFF state if not in operation.

And, as other equipment control device, a device which specifies a position of the radio tag by using a radio tag and a plurality of wireless base stations, and controls equipment on the basis of the position of the radio tag is known (for example, refer to patent document 2). The device described in patent document 2 specifies the position of the radio tag on the basis of a receiving sensitivity value which one radio tag receives from the plurality of wireless base stations respectively. Then, this device gives an ID (Identification) to the radio tag in advance and classifies each ID. Then, when this device detects that the radio tag which is given the ID of a predetermined classification approaches to a predetermined restricted area, it controls output of an alarm sound or an alarm light by using a wireless base station in the neighborhood.

And, as other equipment control device, a device which detects entering and leaving room of a person and controls ON/OFF of a light of a division of the person is known (for example, refer to patent document 3). The device described in patent document 3 includes a card reader, an entering and leaving room management unit, a light specification unit and a light control unit. In this device, the card reader installed at an entrance of the room reads information written on a card such as an employee ID card. Next, the entering and leaving room management unit specifies an ID of the person on the basis of the card information sent from the card reader. Next, the light specification unit specifies a light of the division where a desk of the person exists on the basis of the ID of the person specified. Then, the light control unit controls the specified a light to ON state. And, when the card reader reads the card information of a person who leaves, this device operates similarly to the time of entering room and transmits the information to the light control unit. Then, the light control unit controls the light so as to become OFF state.

And, as other equipment control device, a device which controls air-conditioning equipment on the basis of positional information of a person is known (for example, refer to patent document 4). The device described in patent document 4 acquires distance information to a target in an indoor space from a distance image sensor. This device stores, in advance, a distance equilibrium state in which derivative value regarding time is a threshold value or less about acquired distance information. Then, when time in which a difference value for the distance equilibrium state of the distance information acquired from the distance image sensor is a threshold value or over continues a set time or over, this device detects a distance displacement area where there was displacement of the distance to the target in the indoor space. Then, this device distinguishes whether or not a person exists in the distance displacement area on the basis of comparison of shape characteristics of the distance displacement area and person shape characteristics stored in advance. Then, in case this device distinguishes that a person exists, it calculates direction and distance from air-conditioning equipment to the person. Then, this device controls the air-conditioning equipment in accordance with the direction and the distance calculated.

Further, as a technology related to control of equipment in a space of management target, following technologies are known.

A device which collects an attention target and judges a target device on the basis of a sight line of detected person is known (for example, refer to patent document 5).

And, a system for judging a position of a device on the basis of detection of wireless communication is known (for example, refer to patent document 6).

Further, a security system which estimates posture information of a person from imaging data, judges the person and releases a lock is known (for example, refer to patent document 7).

[Patent document 1] The Japanese Patent Application Laid-Open No. 2001-063186

[Patent document 2] The Japanese Patent Application Laid-Open No. 2007-184738

[Patent document 3] The Japanese Patent Application Laid-Open No. 2009-169543

[Patent document 4] The Japanese Patent Application Laid-Open No. 2009-174830

[Patent document 5] The Japanese Patent Application Laid-Open No. 2001-008197

[Patent document 6] The Japanese Patent Application Laid-Open No. 2002-049538

[Patent document 7] The Japanese Patent Application Laid-Open No. 2010-176563

SUMMARY OF THE INVENTION

Problems to be Solved by the Invention

However, in the equipment control devices mentioned above, there is a case when equipment cannot be controlled appropriately.

As the device described in patent document 1 mentioned above, the power supply is turned on only by existence of someone who is a person near. Accordingly, the device described in patent document 1 had a problem in which the power supply of the printer device turns on even if a person who does not use the printer passes along the neighborhood.

And, the device described in patent document 2 outputs alarm even when a person who carries a radio tag passes around a boundary of the restricted area. For this reason, the device described in patent document 2 had a problem in which it outputs alarm also to a person who recognizes the restricted area.

And, the device described in patent document 3 had a problem in which it turns the light to ON state during a period after a person entering the room until arriving at desk and during a period after leaving desk until leaving the room in spite of unnecessary light.

And, the device described in patent document 4 controls the air conditioning on the basis of the direction and the distance of the distance displacement area when the difference value of the distance information against the distance equilibrium state is the threshold value or over and it continues the set time or over. For this reason, the device described in patent document 4 had a problem in which it cannot start the air-conditioning control for desk until passage of the set time from the time when the person reaches the desk.

And, the device described in patent document 5 judges equipment on the basis of the sight line of the detected person. Therefore, the device described in patent document 5 had a problem in which it cannot judge unless the person looks at the equipment.

And, the system described in patent document 6 judges the position of the device on the basis of layout information registered in advance, and adds it to the layout information. In other words, the system described in patent document 6 is not one which controls a device.

And, the system described in patent document 7 judges a person on the basis of posture information acquired in advance. Therefore, the system described in patent document 7 had a problem in which a user always needs to take the same posture.

The purpose of the present invention is to provide an equipment control device, an equipment control system and an equipment control method which can control equipment more appropriately in accordance with detection of a user and settle the above-mentioned problem.

Means for Solving the Problem

An equipment control device of the present invention includes: equipment layout information storage means for storing equipment layout information including positional information of control-target equipment which becomes a control target in a space of management target; related ID information storage means for storing related ID information representing correspondence relationship between the control-target equipment and an ID (identification) given to a user of the control-target equipment; ID-affixed trajectory information acquisition means for acquiring ID-affixed trajectory information which associates ID of the user with time series of positional information of the user in the space of the management target; and equipment control means for acquiring the control-target equipment concerned which is associated with the ID in the ID-affixed trajectory information on the basis of the related ID information, generating control information for controlling a state of the control-target equipment on the basis of the ID-affixed trajectory information and the equipment layout information, and outputting it to the control-target equipment.

And, an equipment control system of the present invention includes: the equipment control device mentioned above; and a control-target equipment which changes a state on the basis of control information outputted from the equipment control device.

And, an equipment control method of the present invention includes: acquiring ID-affixed trajectory information which associates ID (identification) of the user with times series of positional information of a user in a space of management target; acquiring the control-target equipment to which the ID in the ID-affixed trajectory information is related on the basis of control-target equipment which becomes a control target in the space of the management target and related ID information representing correspondence relationship of the ID related to the control-target equipment; and generating control information which controls a state of the related control-target equipment on the basis of equipment layout information including positional information of the control-target equipment in the space of the management target and the ID-affixed trajectory information, and outputting it to the control-target equipment.

And, a non-transitory computer readable storage medium storing a program of the present invention , said program causing an equipment control device to perform a method, said method includes: acquiring ID-affixed trajectory information which associates ID (identification) of the user with time series of positional information of a user in a space of management target; acquiring the control-target equipment to which the ID in the ID-affixed trajectory information is related on the basis of control-target equipment which becomes a control target in the space of the management target and related ID information representing correspondence relationship of the ID related to the control-target equipment; and generating control information which controls a state of the related control-target equipment on the basis of equipment layout information including positional information of the control-target equipment in the space of the management target and the ID-affixed trajectory information, and outputting it to the control-target equipment.

Effect of the Invention

The present invention can provide an equipment control device, an equipment control system and an equipment control method which can control equipment more appropriately in accordance with detection of a user.

BRIEF DESCRIPTION OF THE DRAWINGS

FIG. 9 is a flow chart explaining operation of the equipment control system of the third exemplary embodiment of the present invention.

EXEMPLARY EMBODIMENT OF THE INVENTION

Hereinafter, exemplary embodiments of the present invention will be explained in detail with reference to drawings.

(The First Exemplary Embodiment)

Figure 1:
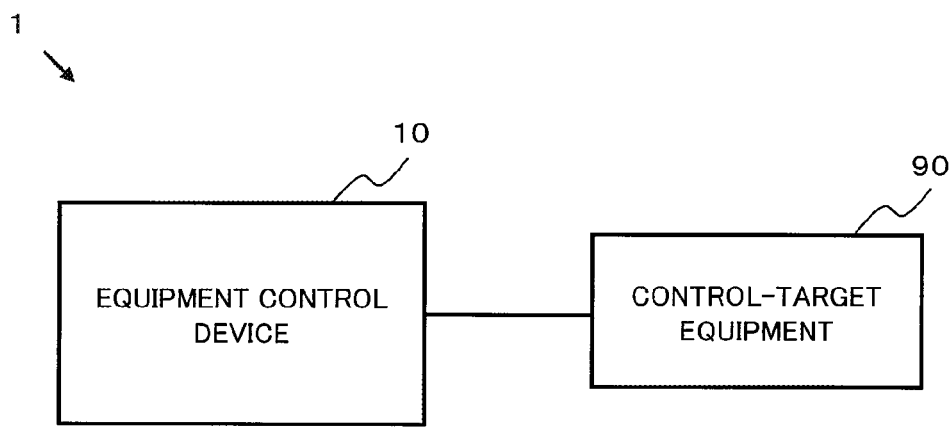
FIG. 1 is a figure showing a structure of an equipment control system of a first exemplary embodiment of the present invention.

An example of a structure of an equipment control system 1 of the first exemplary embodiment of the present invention is shown in FIG. 1.

In FIG. 1, the equipment control system 1 includes an equipment control device 10 and control-target equipment 90. The equipment control device 10 and the control-target equipment 90 are connected so that the equipment control device 10 can control the control-target equipment 90. And, the control-target equipment 90 is located in a space which the equipment control device 10 makes a management target (hereinafter, also referred to as "management target space").

Further, although one control-target equipment 90 is shown in FIG. 1, this does not limit the number of the control-target equipment 90 included in the equipment control system 1 of the first exemplary embodiment of the present invention.

The equipment control device 10 can connect with two or over control-target equipments 90 and control each equipment.

The control-target equipment 90 is an equipment which can change an operation state in accordance with control information outputted from the equipment control device 10. The control-target equipment 90 is, for example, a light, a blind, a printer or a computer device. And, the operation state of the control-target equipment 90 is, for example, ON state in which a function of the control-target equipment 90 is operated and OFF state in which the function is suspended. And, the operation state of the control-target equipment 90 may be a power saving state and so on. And, when the control-target equipment 90 is a blind, the operation state may be an open state in which a louver is opened, a closed state in which the louver is closed, or a half-open state in which the louver is half-opened. Further, the number of the operation states which the control-target equipment 90 can take is not limited. Or, the operation state which the control-target equipment 90 can take may be an intermediate state which can be change between the ON state and the OFF state with no steps.

Figure 2:
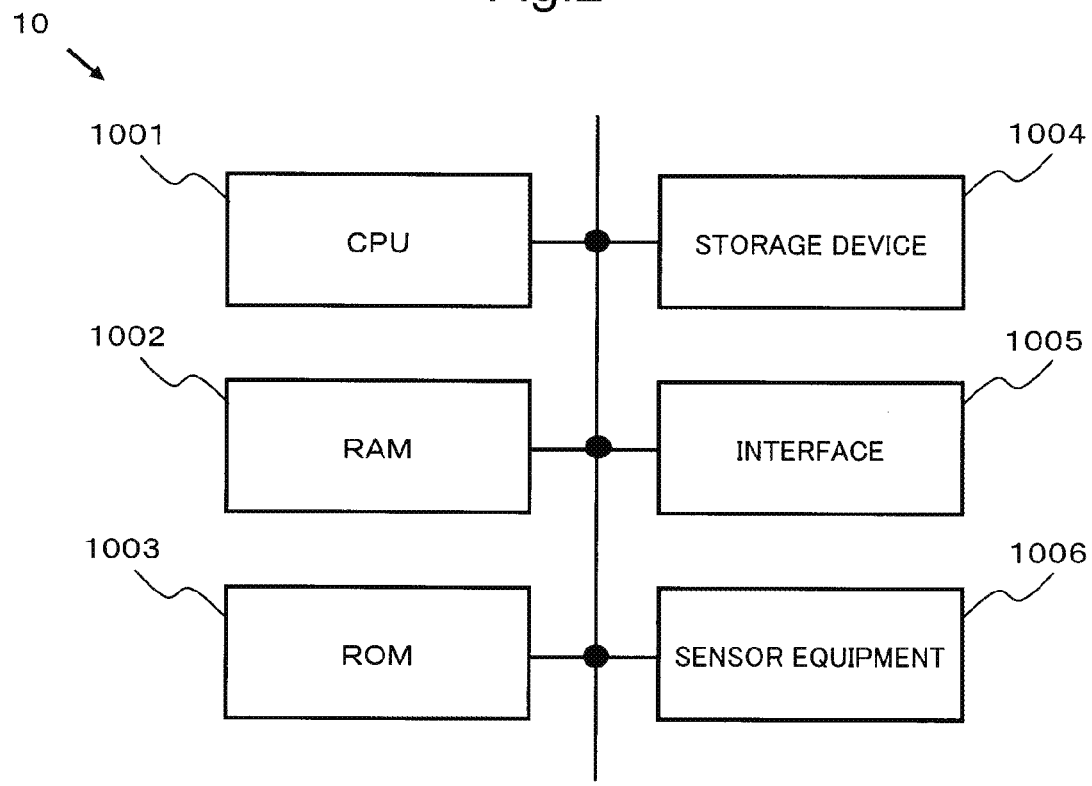
FIG. 2 is a figure showing a structure of hardware of an equipment control device of the first exemplary embodiment of the present invention.

An example of a structure of hardware of each equipment which constructs the equipment control device 10 is shown in FIG. 2.

In FIG. 2, the equipment control device 10 includes CPU (Central Processing Unit) 1001, RAM (Random Access Memory) 1002, ROM (Read Only Memory) 1003, a storage device 1004 such as a hard disk, an interface 1005 and a sensor equipment 1006. For example, the equipment control device 10 may structure a computer device.

The CPU 1001 reads a computer program (or a program module) stored in the ROM 1003 or the storage device 1004, executes the program making the RAM 1002 as a working area, and realizes the function as the equipment control device 10 of the exemplary embodiment.

The interface 1005 is a device which delivers information between the equipment control device 10 and the control-target equipment 90. The interface 1005 may also be a special purpose interface in accordance with the control-target equipment 90. Or, when the control-target equipment 90 is a device which can connect to LAN (Local Area Network), the interface 1005 may be a LAN interface.

The sensor equipment 1006 is a device which can detect information about a user in the management target space. For example, the sensor equipment 1006 may be an RFID (Radio Frequency Identification) reader for reading a radio tag which a user carries, an imaging device for imaging the management target space, and in addition, a sensor device which can detect information about a user, or a combination of these devices.

Further, the interface 1005 and the sensor equipment 1006 may be a device connected outside the equipment control device 10.

Next, an example of a functional block structure of the equipment control device 10 will be explained with reference to FIG. 3.

Figure 3:
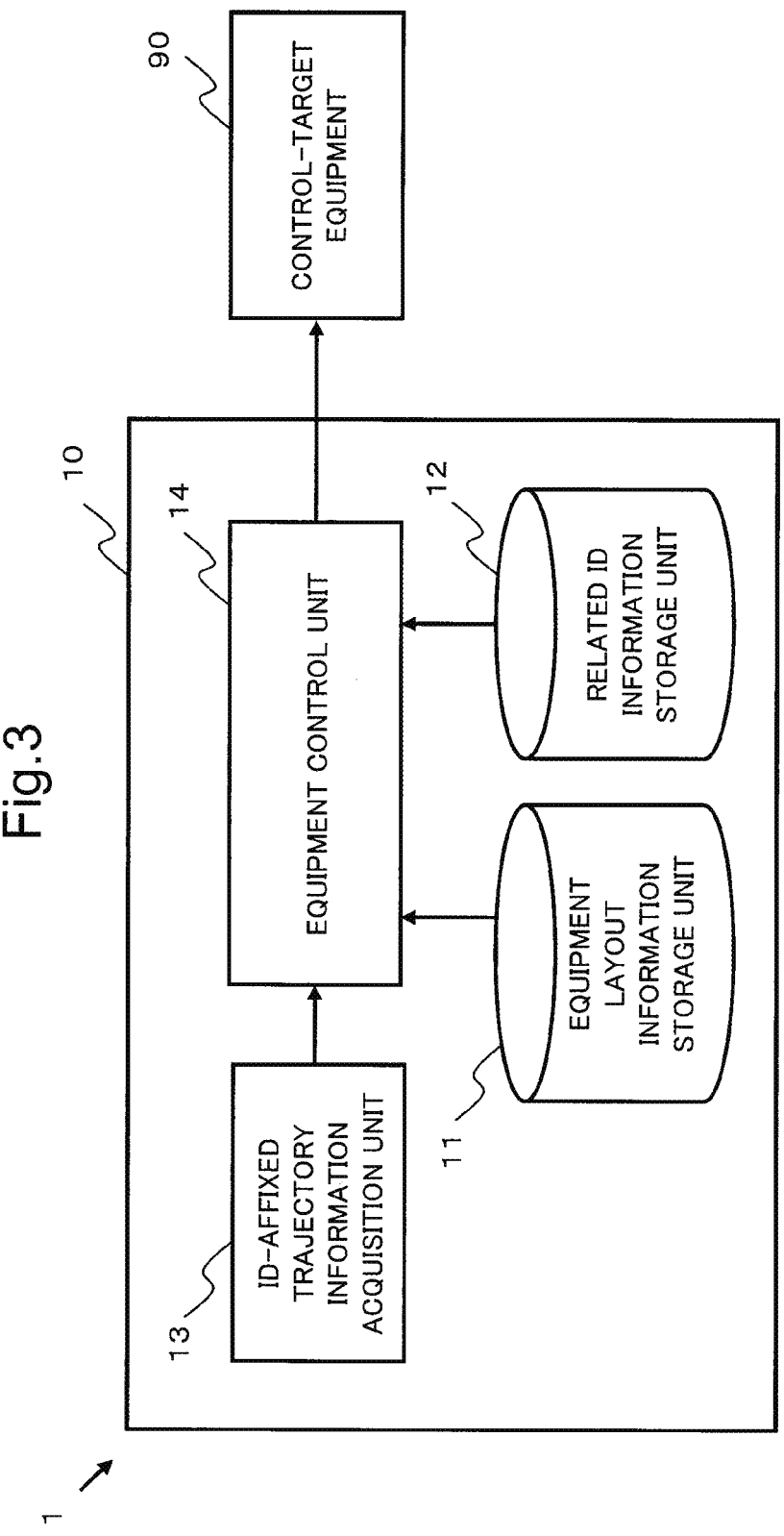
FIG. 3 is a block diagram showing a function of the equipment control device of the first exemplary embodiment of the present invention.

In FIG. 3, the equipment control device 10 includes an equipment layout information storage unit 11, a related ID information storage unit 12, an ID-affixed trajectory information acquisition unit 13 and an equipment control unit 14. And, the equipment control unit 14 is connected with the control-target equipment 90.

Here, correspondence of the structure shown in FIG. 3 and the structure of FIG. 2 is, for example, as follows.

The equipment layout information storage unit 11 and the related ID information storage unit 12 can be structured using the storage device 1004. And, the ID-affixed trajectory information acquisition unit 13 can be structured using the sensor equipment 1006 and the CPU 1001 which reads and executes the computer program stored in the ROM 1003 or the storage device 1004. And, the equipment control unit 14 can be structured using the interface 1005 and the CPU 1001 which reads and executes the computer program stored in the ROM 1003 or the storage device 1004. Further, hardware structure of which constructs each function block of the equipment control device 10 is not limited to the structure of the explanation mentioned above.

The equipment layout information storage unit 11 stores equipment layout information. Here, the equipment layout information is information (positional information) representing a physical layout (position) of the control-target equipment 90 in the management target space. For example, the equipment layout information is information which combined identification information of the control-target equipment 90 and a coordinate which represents a position where the control-target equipment 90 is installed. Further, the equipment layout information storage unit 11 stores the equipment layout information in advance. However, when layout of the control-target equipment 90 is changed like a desk arrangement change or a layout change of a floor, the equipment layout information storage unit 11 may update the equipment layout information.

The related ID information storage unit 12 stores related ID information. Here, the related ID information is information representing correspondence relationship between the identification information of the control-target equipment 90 and an identifier (ID: Identification) given to a user of the control-target equipment 90. Here, in the related ID information, one ID may be associated with the identification information of one control-target equipment 90, or a plurality of IDs may be associated. For example, when the control-target equipment 90 is a light or a blind, the related ID information is information which associates information for identifying the light or the blind with the ID of a user whose desk or work area is within a range where influence of the light or the blind reaches. Or, when the control-target equipment 90 is an equipment which needs authentication such as a personal computer or a printer, the related ID information is information which associates information for identifying the PC or the printer with the ID of the user who has authority for using the equipment. Further, the related ID information storage unit 12 stores the related ID information in advance. However, when change occurs to the related ID information like reorganization or a personnel change, the related ID information storage unit 12 may update the related ID information.

The ID-affixed trajectory information acquisition unit 13 acquires ID-affixed trajectory information. Here, the ID-affixed trajectory information is trajectory information to which the ID of a user is given. And, the trajectory information is information which represents positional information of the user in the management target space as time series. For example, when one point on a floor of an office or a factory is taken as an origin and user's positional coordinates at time t is represented as "X(t), Y(t)", the trajectory information is a time-series data of the positional coordinates (X(t), Y(t)). Then, the ID-affixed trajectory information is, for example, information which combined the time-series data of the positional coordinate and the ID of the user. This ID-affixed trajectory information may be a time-series data of a predetermined duration or may be a time-series data whose duration is adjusted according to movement of the user adaptively. Further, when a plurality of users are detected in the management target space, the ID-affixed trajectory information acquisition unit 13 acquires the ID-affixed trajectory information for the number of users. Further, the ID-affixed trajectory information acquisition unit 13 may acquire a plurality of ID-affixed trajectory information simultaneously, or may acquire it at different timing.

Here, an example of a concrete structure of the ID-affixed trajectory information acquisition unit 13 will be explained with reference to FIG. 4.

Figure 4:
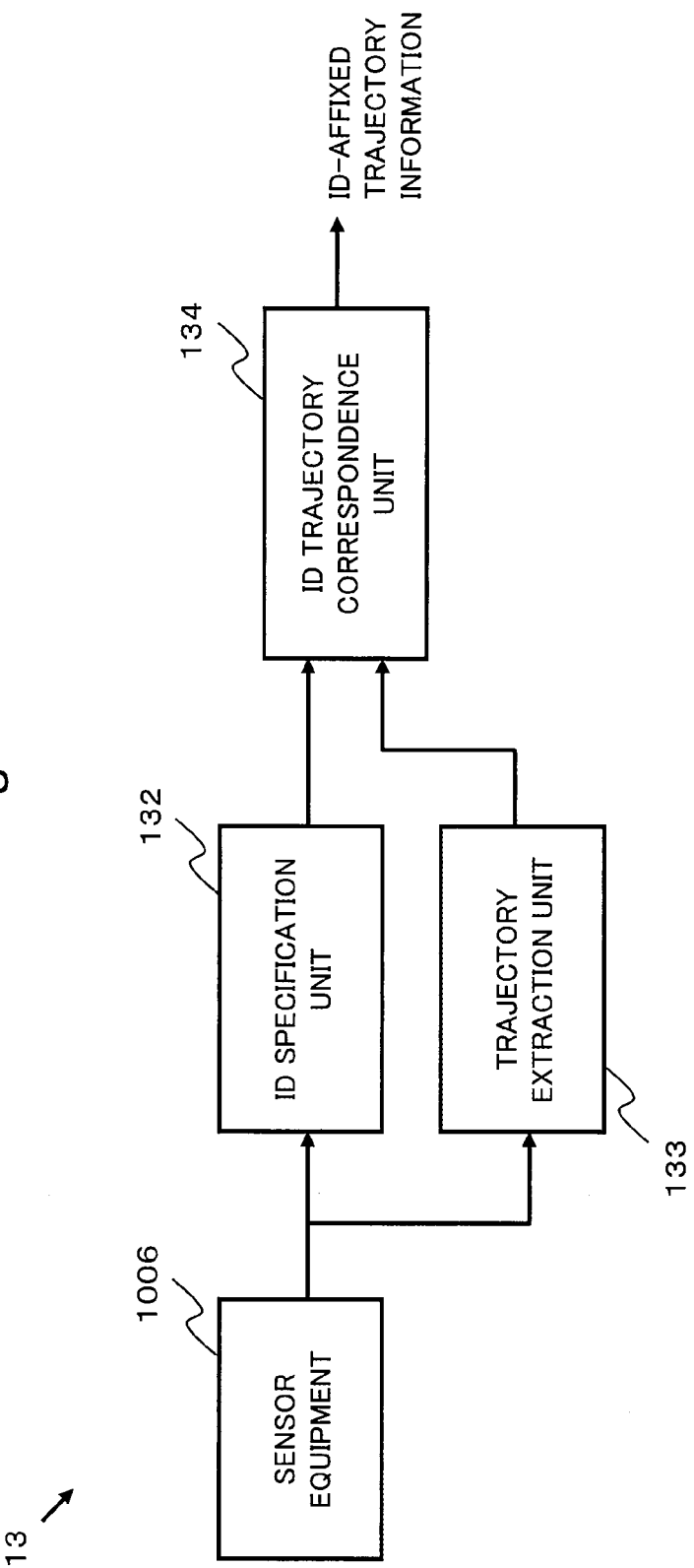
FIG. 4 is a figure showing an example of a structure of an ID-affixed trajectory information acquisition unit of the first exemplary embodiment of the present invention.

The ID-affixed trajectory information acquisition unit 13 shown in FIG. 4 includes the sensor equipment 1006, an ID specification unit 132, trajectory extraction unit 133 and an ID trajectory correspondence unit 134.

Here, correspondence of the structure shown in FIG. 4 and the structure of FIG. 2 is, for example, as follows.

The ID specification unit 132, the trajectory extraction unit 133 and the ID trajectory correspondence unit 134 can be structured using the CPU 1001 which reads and executes the computer program stored in the ROM 1003 or the storage device 1004.

The ID specification unit 132 specifies the ID of the user detected in the management target space.

For example, when the sensor equipment 1006 includes an RFID reader, the ID specification unit 132 may receive the ID stored in a radio tag which the user carries using the RFID reader.

Or, when the sensor equipment 1006 includes an imaging device, the ID specification unit 132 may specify the ID of the user using the imaging device. In this case, the ID specification unit 132 detects an area where a face of a person in an image captured by the imaging device is included. Then, the ID specification unit 132 may match the detected area and a facial image of the user registered with the ID in advance, and may specify the ID of the user.

The trajectory extraction unit 133 calculates the position (positional information) of the user detected in the management target space. For example, when the sensor equipment 1006 includes an imaging device, the trajectory extraction unit 133 may calculate the position of the user using the imaging device. In this case, the trajectory extraction unit 133 extracts an area where a person is included from an image captured by the imaging device. Then, the trajectory extraction unit 133 calculates the position of the user in the management target space using information (for example, calibration information) which associates coordinates of the image with coordinates of the management target space which is a real space.

The ID trajectory correspondence unit 134 specifies correspondence relationship between the ID specified by the ID specification unit 132 and the position (positional information) calculated by the trajectory extraction unit 133. Then, for each ID, the ID trajectory correspondence unit 134 generates ID-affixed trajectory information which is time series positional information associated with the ID. For example, the ID trajectory correspondence unit 134 may specify the correspondence relationship on the basis of a distance between an approximate position of the RFID estimated by using the RFID reader which the ID specification unit 132 uses for specifying the ID and a position which the trajectory extraction unit 133 calculates using the imaging device. Or, when the ID specification unit 132 and the trajectory extraction unit 133 use an imaging device, the ID trajectory correspondence unit 134 may match information of clothes which the ID specification unit 132 acquires together with a face image area and information of clothes which the trajectory extraction unit 133 acquires together with a person's image area, and may specify the correspondence relationship. In this way, the ID trajectory correspondence unit 134 can make the association by matching a same kind of information which both of the ID specification unit 132 and the trajectory extraction unit 133 can acquire.

Further, the ID-affixed trajectory information acquisition unit 13 is not limited to the structure mentioned above. The ID-affixed trajectory information acquisition unit 13 can be applied general technology which continuously detects the ID and the position of the user in the management target space.

And, the ID-affixed trajectory information acquisition unit 13 outputs the acquired ID-affixed trajectory information to the equipment control unit 14. In this outputting, the ID-affixed trajectory information acquisition unit 13 may output the ID-affixed trajectory information whenever new ID-affixed trajectory information is added and updated.

Or, the ID-affixed trajectory information acquisition unit 13 may output the ID-affixed trajectory information in a time interval set in advance.

The equipment control unit 14 matches the ID-affixed trajectory information and the related ID information. On the basis of this matching, the equipment control unit 14 acquires information representing the control-target equipment 90 which is associated with the ID indicated by the ID-affixed trajectory information. Then, the equipment control unit 14 decides a state of the control-target equipment 90 on the basis of the equipment layout information related to the control-target equipment 90 and the ID-affixed trajectory information. For example, the equipment control unit 14 may decide whether it makes the control-target equipment 90 ON state or OFF state on the basis of whether or not positional information of a predetermined period included in the ID-affixed trajectory information is included in a predetermined range from the position of the control-target equipment 90. Then, the equipment control unit 14 generates control information for controlling the state of the control-target equipment 90 so as to become the decided state, and outputs it to the control-target equipment 90. Further, when the control-target equipment 90 which is associated with the ID indicated by the ID-affixed trajectory information is not stored in the related ID information storage unit 12, the equipment control unit 14 does not decide the state of the control-target equipment 90 (or does not output the control information).

Figure 5:
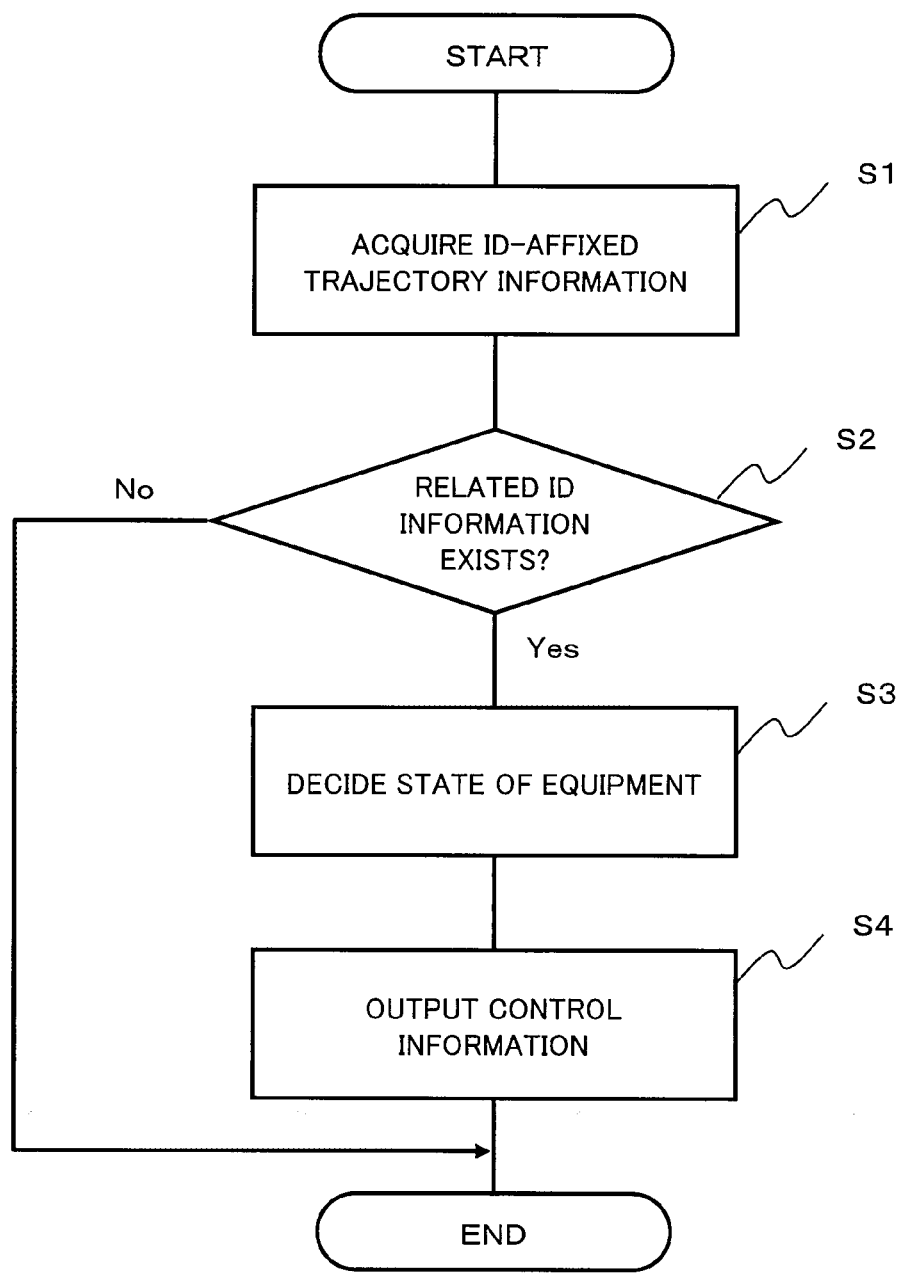
FIG. 5 is a flow chart explaining operation of the equipment control system of the first exemplary embodiment of the present invention.

Operation of the equipment control system 1 structured as above will be explained with reference to FIG. 5. Further, in FIG. 5, it is supposed that the equipment layout information storage unit 11 and the related ID information storage unit 12 already store the equipment layout information and the related ID information.

First, the ID-affixed trajectory information acquisition unit 13 acquires the ID-affixed trajectory information (Step S1).

Next, the equipment control unit 14 judges whether or not there is the control-target equipment 90 with which the ID in the ID-affixed trajectory information acquired in Step S1 is associated by referring to the related ID information storage unit 12 (Step S2).

When there is no control-target equipment 90 (No in Step S2), the equipment control system 1 ends the operation.

When there is a control-target equipment 90 (Yes in Step S2), the equipment control unit 14 decides a state of the control-target equipment 90 on the basis of the equipment layout information stored in the equipment layout information storage unit 11 and the ID-affixed trajectory information acquired in Step S1 (Step S3).

Next, the equipment control unit 14 generates the control information for controlling the control-target equipment 90 so as to become the state which was decided in Step S3, and outputs it to the control-target equipment 90 (Step S4).

The control-target equipment 90 changes the state according to the control information.

As above, the equipment control system 1 ends the operation.

Next, in such equipment control system 1, a case when a light is applied to the control-target equipment 90 will be explained.

The equipment layout information storage unit 11 stores in advance correspondence relationship between identification information of light allocated to each desk in an office (management target space) and positional information of the light as equipment layout information.

The related ID information storage unit 12 stores correspondence relationship between the identification information of the light and an ID of a user who uses the desk in the office where the light was installed as related ID information.

Then, the equipment control unit 14 acquires the identification information of the light which is associated with the ID in the ID-affixed trajectory information acquired by the ID-affixed trajectory information acquisition unit 13. Then, the equipment control unit 14 decides a state of the light on the basis of the position of the light and the ID-affixed trajectory information. For example, when positional information of a predetermined period included in the ID-affixed trajectory information is included in a predetermined range from the position of the light, the equipment control unit 14 decides the light to be ON state and outputs control information. On the other hand, when the positional information is not included in this predetermined range, the equipment control unit 14 decides the light to be OFF state and outputs the control information. On the basis of this control, the equipment control unit 14 can detect whether the user of the desk approaches to or goes away from the light allocated to each desk, and control ON/OFF of the light. And, even if a person other than the user of the desk in the office approaches each light, the equipment control unit 14 does not control the light so as to become ON state.

And, in such equipment control system 1, a case when a PC (personal computer) is applied to the control-target equipment 90 will be explained.

In this case, the equipment layout information storage unit 11 stores correspondence relationship between identification information of the PC allocated to each desk in an office (management target space) and its positional information as equipment layout information.

And, the related ID information storage unit 12 stores in advance an ID of a user with use authority for each PC.

Then, the equipment control unit 14 controls the PC which is associated with the ID in the ID-affixed trajectory information acquired by the ID-affixed trajectory information acquisition unit 13 like the case of the light. On the basis of this control, the equipment control unit 14 can detect whether the user with use authority of the PC approaches to or goes away, and control switching between ON state and power saving state of the PC. Further, when the equipment control unit 14 judges that the user with use authority does not approach even if a predetermined period has passed after it had controlled the PC so as to become the power saving state on the basis of the ID-affixed trajectory information, it can control the PC so as to become OFF state. And, even if a person other than the user with use authority approaches each PC, the equipment control unit 14 does not control the PC to ON state.

Next, effect of the first exemplary embodiment of the present invention is described.

The equipment control system 1 of the first exemplary embodiment of the present invention can appropriately control the control-target equipment 90 in accordance with detection of the user.

The reason is as follows.

The ID-affixed trajectory information acquisition unit 13 of the equipment control device 10 acquires the ID-affixed trajectory information which is given the ID of the user. Then, the equipment control unit 14 refers to the related ID information storage unit 12, and specifies the control-target equipment 90 which is associated with the ID in the ID-affixed trajectory information. Then, because the equipment control unit 14 outputs control information to the specified control-target equipment 90 so that the specified control-target equipment 90 will be in the state decided on the basis of the ID-affixed trajectory information and the equipment layout information.

On the basis of this control, even if the equipment control system 1 of this exemplary embodiment detects the user with the ID which is not associated with the control-target equipment 90, it does not control the state of the control-target equipment 90. Accordingly, for example, the equipment control system 1 of this exemplary embodiment does not change the printer so as to become ON state even when a person who does not use the printer passes.

And, the equipment control system 1 of this exemplary embodiment decides a state of the control-target equipment 90 on the basis of, not the positional information of the user at a certain time, but the ID-affixed trajectory information which is time series of the positional information. For this reason, when the user passes around the boundary of the predetermined range from the equipment, the equipment control system 1 of this exemplary embodiment can control so as not to change the state of the control-target equipment 90.

And, the equipment control system 1 of this exemplary embodiment can control the state of the equipment at the time when it detects the trajectory which approaches the control-target equipment 90. Accordingly, the equipment control system 1 of this exemplary embodiment can, for example, start air-conditioning control for the own desk even if more than setting time has passed since the user reached the own desk.

And, the equipment control system 1 of the first exemplary embodiment of the present invention can improve a power saving effect of the control-target equipment 90.

The reason is because the equipment control unit 14 decides whether or not to change the equipment to ON state using, not the positional information of the user at a certain time, but the ID-affixed trajectory information. On the basis of this control, because the equipment control system 1 of the first exemplary embodiment of the present invention can suppress output of the control information of ON state to the control-target equipment 90 when the situation of the user is not appropriate even if it detects the user.

And, the equipment control system 1 of the first exemplary embodiment of the present invention can improve security of the control-target equipment 90.

The reason is because the equipment control unit 14 controls the equipment which is associated with the ID so as to become ON state on the basis of the related ID information, since the related ID information storage unit 12 stores the related ID information associated with the ID of the user who has a use authority for the equipment. On the basis of this control, because the equipment control system 1 of the first exemplary embodiment of the present invention does not, for example, change the control-target equipment 90 to ON state when it detects a user who does not have a use authority of the PC or the printer.

(The Second Exemplary Embodiment)

Next, the second exemplary embodiment of the present invention will be explained in detail with reference to drawings. Further, in each drawing referred to in the explanation of this exemplary embodiment, an identical code is attached to a structure similar to the first exemplary embodiment of the present invention and a step which operates similarly, and detailed explanation in this exemplary embodiment is omitted.

Figure 6:
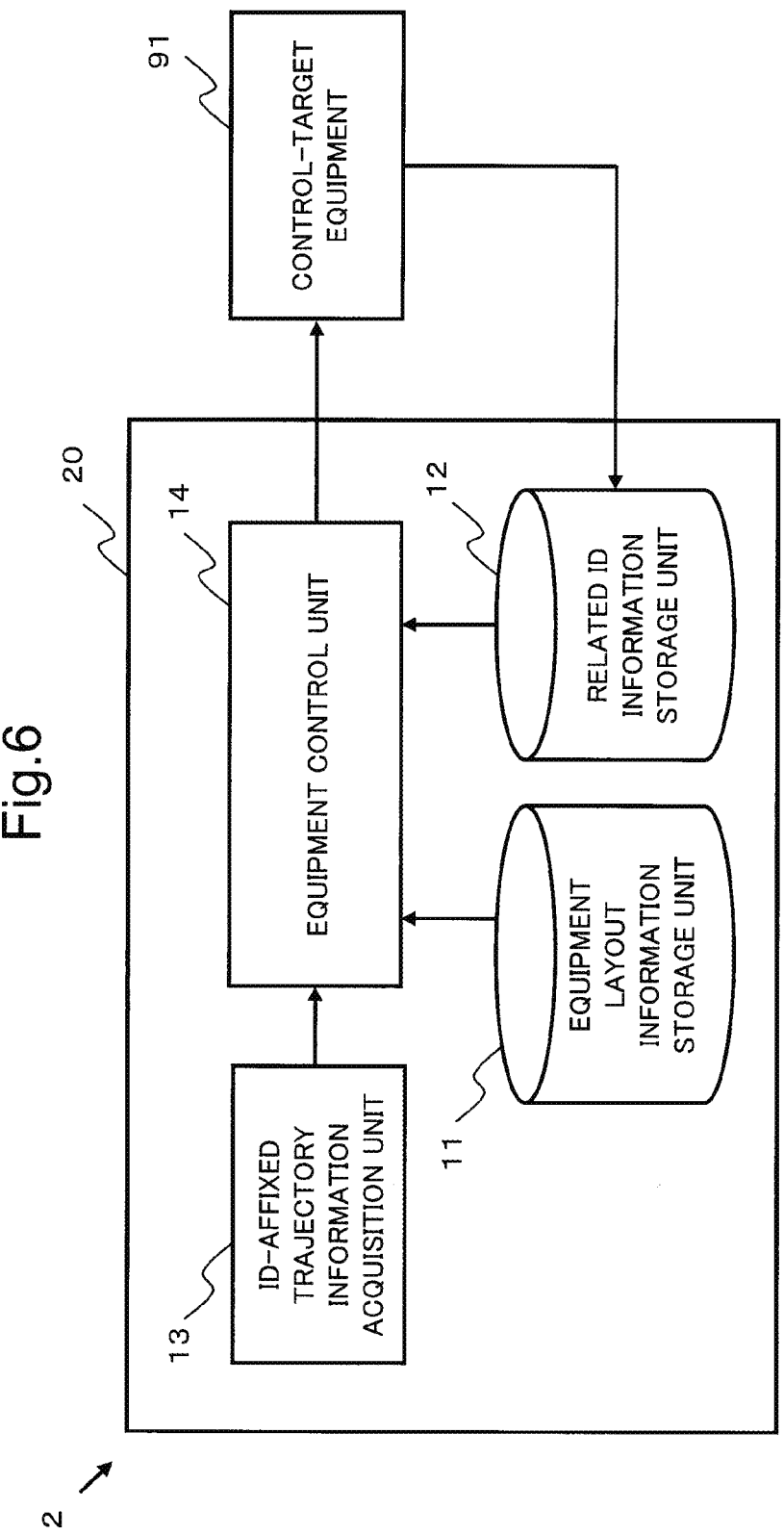
FIG. 6 is a block diagram showing a function of an equipment control system of a second exemplary embodiment of the present invention.

First, an example of a structure of an equipment control system 2 of the second exemplary embodiment of the present invention is shown in FIG. 6. In FIG. 6, the equipment control system 2 includes an equipment control device 20 and control-target equipment 91. Here, the equipment control device 20 can be structured, for example, similarly to the first exemplary embodiment of the present invention, using the computer device explained with reference to FIG. 2. Further, although one control-target equipment 91 is shown in FIG. 6, this does not limit the number of the control-target equipment 91 included in the equipment control system 2 of the second exemplary embodiment of the present invention. The equipment control device 20 can connect with the two or over control-target equipments 91 and control each equipment.

The control-target equipment 91, in addition to the similar structure as the control-target equipment 90 in the first exemplary embodiment of the present invention, outputs information representing an ID of a user which changes dynamically in own device to the equipment control device 20. Here, the ID of the user which changes dynamically is, for example, the ID of the user of a task which stays in a print queue at present when the control-target equipment 91 is a printer device.

The equipment control device 20 is different from the equipment control device 10 in the first exemplary embodiment of the present invention in a point that it includes a related ID information storage unit 22 instead of the related ID information storage unit 12.

The related ID information storage unit 22 the ID of the user acquired from the control-target equipment 91 and the identification information of the control-target equipment 91 which are associated as the related ID information. And, whenever an updated ID of a user is outputted from the control-target equipment 91, the related ID information storage unit 22 updates the related ID information which is already stored.

Operation of the equipment control system 2 structured as above is similar to the operation of the equipment control system 1 of the first exemplary embodiment of the present invention explained with reference to FIG. 5. However, the equipment control system 2 is different from the operation of the equipment control system 1 of the first exemplary embodiment of the present invention in a point that it refers to the related ID information storage unit 22 in which the related ID information is updated dynamically in Step S2 of FIG. 5. On the basis of this operation, the equipment control system 2 controls the state of the control-target equipment 91 which the user with the ID in the ID-affixed trajectory information can use at the time.

Next, in such equipment control system 2, a case when a printer device with authentication function is applied to the control-target equipment 91 will be explained.

The equipment layout information storage unit 11 stores positional information of the printer device with authentication function.

When the printer device with authentication function receives a task of a print target from such as a PC connected so that it can communicate, it adds the task to a print queue.

Then, the printer device with authentication function sends an ID of a user of the task stayed in the print queue to the equipment control device 20.

The related ID information storage unit 22 associates the ID of the user received from the printer device with authentication function with identification information of the printer device with authentication function, and stores them as related ID information.

Then, when the equipment control unit 14 acquires ID-affixed trajectory information from the ID-affixed trajectory information acquisition unit 13, it matches the acquired ID-affixed trajectory information and the related ID information of the related ID information storage unit 22.

When there is related ID information including the ID in the ID-affixed trajectory information, the print task with the ID of the user stays in the printer device with authentication function. Therefore, when the equipment control unit 14 judges that the user with the ID is near the printer device with authentication function on the basis of this ID-affixed trajectory information and the positional information of the printer device with authentication, it makes the printer device with authentication function return from the power saving state to ON state.

On the other hand, when there is no related ID information including the ID in the ID-affixed trajectory information, the equipment control unit 14 does not output control information for changing the state of the printer device with authentication function. That is, even if a user who does not have a task in the print queue approaches the printer device with authentication function, the printer device with authentication function will stay in the power saving state.

Next, effect of the second exemplary embodiment of the present invention is described.

The equipment control system 2 of the second exemplary embodiment of the present invention can control a state of the control-target equipment 91 on the basis of the ID-affixed trajectory information of the appropriate user even when a user who can use the control-target equipment 91 is changed dynamically.

The reason is because the related ID information storage unit 22 acquires the ID of the user of the control-target equipment 91 changed dynamically from the control-target equipment 91, and updates the related ID information. On the basis of this update, for example, the equipment control system 2 of the second exemplary embodiment of the present invention does not change the printer device with authentication function to ON state, even if it detects the trajectory of the user who does not have a task in the print queue of the printer device with authentication function in the neighborhood of the printer device with authentication function. Accordingly, when a proper user of the control-target equipment 91 is changed dynamically, the equipment control system 2 of the second exemplary embodiment of the present invention can control the state of the control-target equipment 91 so that the control-target equipment 91 becomes usable for the appropriate user.

(The Third Exemplary Embodiment)

Next, the third exemplary embodiment of the present invention will be explained in detail with reference to drawings. Further, in each drawing referred to in the explanation of this exemplary embodiment, an identical code is attached to a structure similar to the first exemplary embodiment of the present invention and a step which operates similarly, and detailed explanation in this exemplary embodiment is omitted.

Figure 7:
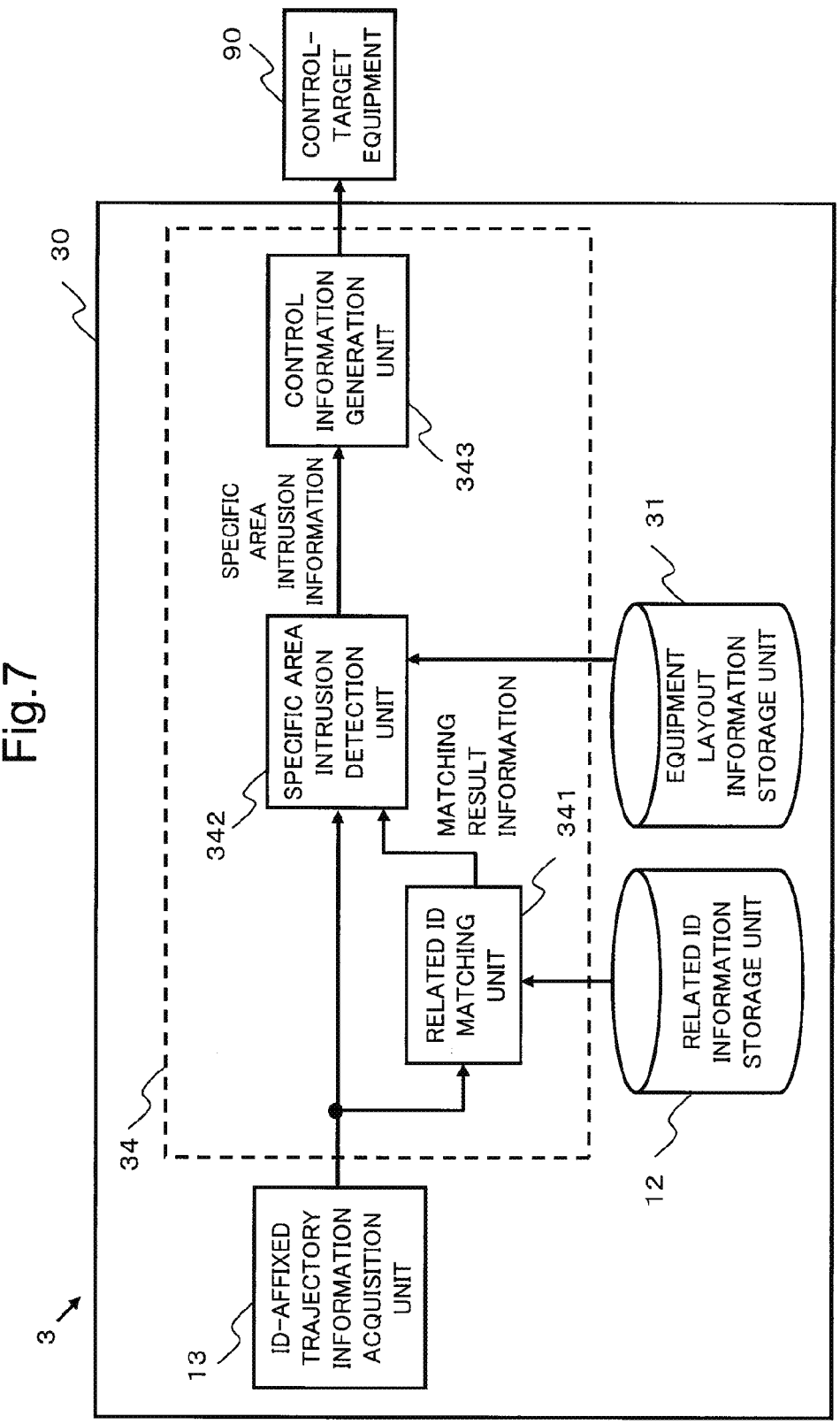
FIG. 7 is a block diagram showing a function of an equipment control system of a third exemplary embodiment of the present invention.

First, an example of a structure of an equipment control system 3 of the third exemplary embodiment of the present invention is shown in FIG. 7. In FIG. 7, the equipment control system 3 includes an equipment control device 30 and the control-target equipment 90. Here, the equipment control device 30 can be structured, for example, similarly to the equipment control device 10 of the first exemplary embodiment of the present invention, using the computer device as shown in FIG. 2. Further, although one control-target equipment 90 is shown in FIG. 7, this does not limit the number of the control-target equipment 90 included in the equipment control system 3 of the third exemplary embodiment of the present invention. The equipment control device 30 can connect with the two or over control-target equipments 90 and control each equipment.

The equipment control device 30 is different from the equipment control device 10 of the first exemplary embodiment of the present invention in a point that it includes an equipment layout information storage unit 31 instead of the equipment layout information storage unit 11 and an equipment control unit 34 instead of the equipment control unit 14

The equipment layout information storage unit 31 stores equipment layout information including positional information of the control-target equipment 90 in the management target space like the equipment layout information storage unit 11 in the first exemplary embodiment of the present invention,. And, the equipment layout information storage unit 31 can store information representing a direction on the basis of the position of the control-target equipment 90 included in the equipment layout information. This information representing the direction is information of the direction in which a user using the control-target equipment 90 is positioned. When it is appropriate that the control-target equipment 90 is controlled on the basis of whether or not the user is positioned in a specific direction of the position of the equipment, information representing the specific direction is set in advance as the information representing the direction. For example, it is desirable that a printer device becomes ON state when the user is positioned in the direction of an operation panel side. Therefore, when the control-target equipment 90 is the printer device, the equipment layout information storage unit 31 stores identification information of the printer device, its positional information and vector information representing the direction of the operation panel side from the position so that they are associated.

Moreover, the equipment layout information storage unit 31 can store information representing a use area in the management target space of the control-target equipment 90 included in the equipment layout information. This use area is an area in which the user using the control-target equipment 90 is positioned at time when using the control-target equipment 90. When it is appropriate that the control-target equipment 90 is controlled in case the user is positioned in a certain area in the management target space, information representing the area is set in advance as the information representing the use area. For example, when the control-target equipment 90 is a blind, the equipment layout information storage unit 31 stores identification information of the blind, its positional information and information representing the use area including a desk which is allocated in the neighborhood of a window where the blind is installed so that they are associated.

Further, the equipment layout information storage unit 31 may store information (aisle information) representing an aisle area in the management target space included in the equipment layout information. When the area including the position of the user by whom it is desirable that the control-target equipment 90 is controlled is influenced on the basis of the aisle area, the aisle information is set in advance. For example, when a desk is allocated in part of a predetermined range from the position of the control-target equipment 90, it is not desirable that the control-target equipment 90 is controlled on the basis of desk occupancy of the user of the desk. However, when the user is detected in the aisle area within the predetermined range from the position of the control-target equipment 90, it is desirable that the control-target equipment 90 is controlled. In this case, the equipment layout information storage unit 31 includes the aisle information in the equipment layout information.

The equipment control unit 34 includes a related ID matching unit 341, a specific area intrusion detection unit 342 and a control information generation unit 343.

The related ID matching unit 341 matches the ID-affixed trajectory information acquired by the ID-affixed trajectory information acquisition unit 13 and the related ID information stored in the related ID information storage unit 12. Then, the related ID matching unit 341 outputs matching result information representing whether or not there is related ID information including the ID in the ID-affixed trajectory information. Further, when the ID-affixed trajectory information acquisition unit 13 acquires a plurality of the ID-affixed trajectory information, the related ID matching unit 341 outputs the matching result information about each ID-affixed trajectory information.

The specific area intrusion detection unit 342 refers to the equipment layout information storage unit 31, and decides a specific area of the control-target equipment 90. Here, the specific area is an area in which the state of the control-target equipment 90 is changed in the management target space, when the user intrudes.

Here, a concrete example of the specific area of the control-target equipment 90 which the specific area intrusion detection unit 342 decides with reference to the equipment layout information storage unit 31 will be explained with reference from FIG. 8A to FIG. 8C.

Figure 8A:
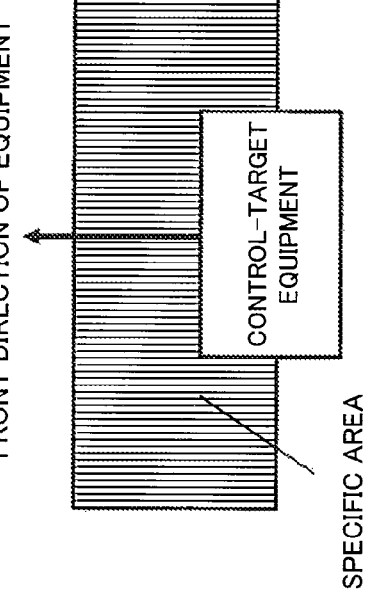
FIG. 8A is a schematic diagram exemplifying a specific area of the third exemplary embodiment of the present invention.

For example, as shown in FIG. 8A, the specific area intrusion detection unit 342 may make an area within a predetermined distance from the position the specific area by using the positional information of the control-target equipment 90 included in the equipment layout information.

Figure 8B:
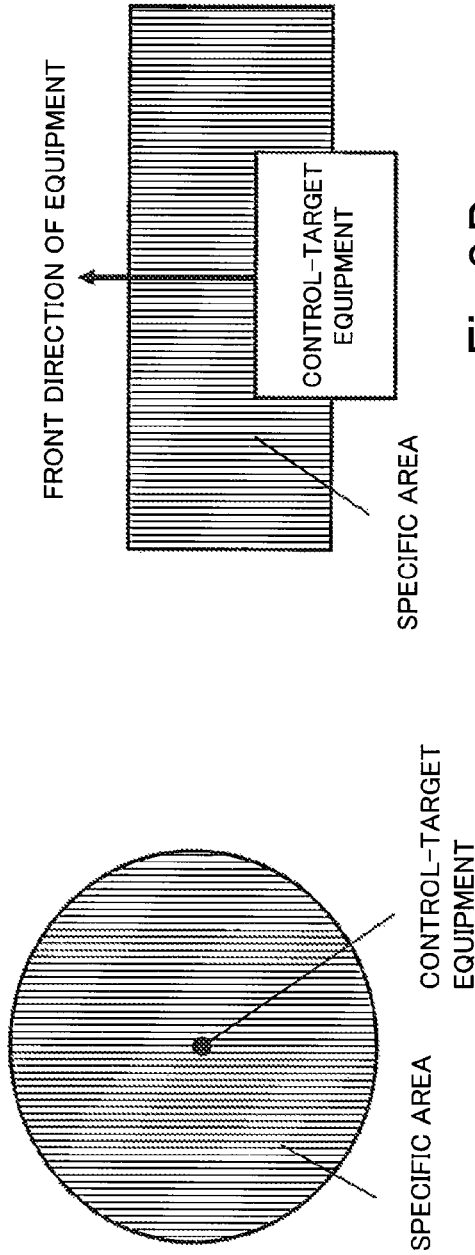
FIG. 8B is a schematic diagram exemplifying a specific area of the third exemplary embodiment of the present invention.

And, as shown in FIG. 8B, the specific area intrusion detection unit 342 may decide a non-isotropic specific area by using the positional information of the control-target equipment 90 included in the equipment layout information and information representing a direction. For example, when the positional information of a printer device and vector information representing a direction (front direction) of an operation panel side from the position can be referred to, the specific area intrusion detection unit 342 may make an area in the vector direction from the position of the printer device up to a predetermined distance and with a predetermined width the specific area. Using this specific area, when a user passes an area in a rear side of the printer device, the specific area intrusion detection unit 342 can judge that the user does not intrude the specific area. Then, when the user is positioned in the area of the front side of the printer device, the specific area intrusion detection unit 342 can judge that the user intruded the specific area.

Figure 8C:
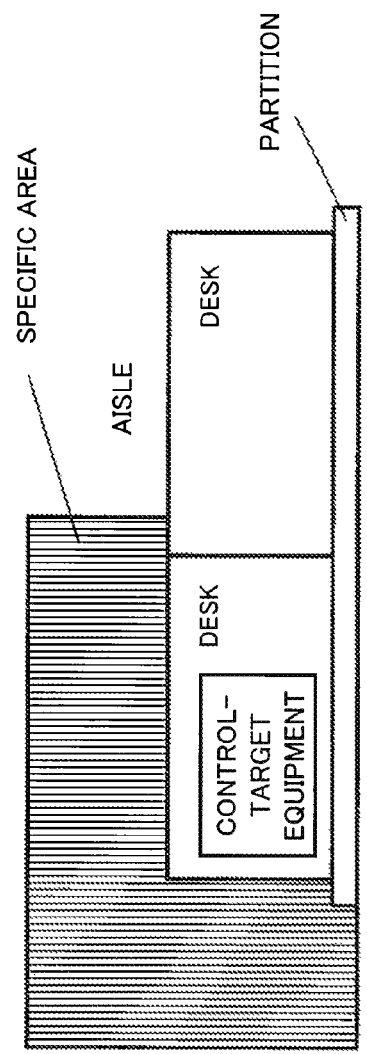
FIG. 8C is a schematic diagram exemplifying a specific area of the third exemplary embodiment of the present invention.

And, as shown in FIG. 8C, the specific area intrusion detection unit 342 may decide a specific area by using the position of the control-target equipment 90 included in the equipment layout information and aisle information. For example, the specific area intrusion detection unit 342 may make a predetermined range on the aisle-side from the position of the control-target equipment 90 be the specific area.

And, when the information of use area of the control-target equipment 90 is included in the equipment layout information, the specific area intrusion detection unit 342 may make the use area the specific area.

Further, the specific area intrusion detection unit 342 may combine exemplified information in FIG. 8A to FIG. 8C and decide the specific area.

Moreover, the specific area intrusion detection unit 342 may refer to positional information of other control-target equipment 90 in order to decide a specific area of certain control-target equipment 90.

And, the specific area intrusion detection unit 342 stores the specific area of the control-target equipment 90 decided in this way in a predetermined storage device (for example, the storage device 1004 of FIG. 2). Then, when the ID-affixed trajectory information is acquired, the specific area intrusion detection unit 342 uses the information representing the stored specific area in order to detect intrusion situation of the user with the ID to the specific area.

Concretely, the specific area intrusion detection unit 342 receives the matching result information from the related ID matching unit 341. Then, when the matching result information represents that there is related ID information including the ID in the ID-affixed trajectory information, the specific area intrusion detection unit 342 judges whether or not the ID-affixed trajectory information satisfies a predetermined intrusion judgment criterion for the specific area of the control-target equipment 90 associated with the ID. Then, the specific area intrusion detection unit 342 generates specific area intrusion information representing the intrusion situation of the user who is given the ID in the ID-affixed trajectory information to the specific area on the basis of the judgment result.

For example, the predetermined intrusion judgment criterion is whether or not the positional information within a predetermined period in the past included in the ID-affixed trajectory information is included in the specific area. Further, when the predetermined period is set appropriately, the specific area intrusion detection unit 342 can prevent a frequent change of the judgment result of whether or not the user with the ID intrudes the specific area using the intrusion judgment criterion.

And, the specific area intrusion detection unit 342 may calculate passing speed at the time of the user crossing a boundary of the specific area on the basis of the ID-affixed trajectory information, and change the intrusion judgment criterion mentioned above in accordance with the passing speed calculated. And, the specific area intrusion detection unit 342 may calculate a passing direction on the boundary representing whether the user intrudes inside from outside of the specific area or goes away from inside to outside on the basis of the ID-affixed trajectory information, and change the intrusion judgment criterion mentioned above on the basis of the passing direction calculated.

For example, when the passing direction is an intrusion direction and the passing speed is a predetermined speed or over, the specific area intrusion detection unit 342 may judge immediately the intrusion in the specific area without checking the positional information of the predetermined period in the past. On the other hand, when the passing direction is an intrusion direction and the passing speed is less than the predetermined speed, the specific area intrusion detection unit 342 judges whether or not time series of the positional information during a predetermined period from the time point are included in the specific area. Then, when the time series are still included after the predetermined period passes, the specific area intrusion detection unit 342 may judge the intrusion in the specific area. In this way, the specific area intrusion detection unit 342 assumes the user who approaches the control-target equipment 90 with a fixed speed or over as the user who has an intention to use the control-target equipment 90 on the basis of change in the judgment criterion using the passing speed and the passing direction. Consequently, the specific area intrusion detection unit 342 can prevents delay of intrusion judgment. On the other hand, the specific area intrusion detection unit 342 assumes a user who approaches the control-target equipment 90 with less than the fixed speed as the user who uses the control-target equipment 90 after it confirms the position in the predetermined period in the specific area of the control-target equipment 90. Consequently, the specific area intrusion detection unit 342 can improve precision of the intrusion judgment.

And, for example, when the passing direction is the intrusion direction, the specific area intrusion detection unit 342 may judge the intrusion in the specific area at the time when the user's latest position entered inside an area which reduced the specific area from the boundary by a predetermined margin. On the other hand, when the passing direction is a going away direction, the specific area intrusion detection unit 342 may judge the leaving from the specific area at the time the user's latest position exited outside an area which expanded the specific area from the boundary by a predetermined margin. On the basis of these judgment schemes, when a person exists around the boundary of the specific area, the specific area intrusion detection unit 342 can prevent a frequent change in the judgment result of the user's intrusion.

And, the specific area intrusion detection unit 342 may generate a parameter representing a degree of intrusion to the specific area intrusion information of the user included in the specific area intrusion information on the basis of the ID-affixed trajectory information. This parameter may be, for example, an expression of a distance from the position of the control-target equipment 90 to the user's latest position. For example, it is supposed that a value of the parameter at the position of the boundary of the specific area of the control-target equipment 90 is 0, and a value of the parameter at the position of the control-target equipment 90 is 1. The parameter of this case takes a value between 0 and 1 in accordance with the distance between the user's latest position and the position of the control-target equipment 90, and the nearer to the position of the control-target equipment 90, the nearer it approaches the value 1.

Further, when a plurality of ID-affixed trajectory information is acquired, the specific area intrusion detection unit 342 generates the specific area intrusion information related to the user with the ID of each ID-affixed trajectory information.

The control information generation unit 343 generates the control information for controlling the control-target equipment 90 on the basis of the specific area intrusion information. For this reason, for example, the control information generation unit 343 may store correspondence relationship between the specific area intrusion information and the state of the control-target equipment 90 in advance. Then, the control information generation unit 343 may generate the control information such that the control-target equipment 90 becomes the state which is associated with the specific area intrusion information generated by the specific area intrusion detection unit 342.

For example, the specific area intrusion information representing intrusion to the specific area may be associated with an operating state of the control-target equipment 90. On the basis of this specific area intrusion information, the control information generation unit 343 generates the control information for keeping the control-target equipment 90 in the operating state. For example, when the control-target equipment 90 is a light, the control information generation unit 343 outputs the control information for keeping the light in the state of being on to the light.

On the other hand, the specific area intrusion information representing no intrusion to the specific area may be associated with a stopped state of the control-target equipment 90. On the basis of this specific area intrusion information, the control information generation unit 343 generates the control information for keeping the control-target equipment 90 in the stopped state. For example, when the control-target equipment 90 is a light, the control information generation unit 343 outputs the control information for keeping the light in the state of being off to the light.

Further, the control information generated by the control information generation unit 343 differs according to the control-target equipment 90.

And, the control information generation unit 343 may store the control information outputted to the control-target equipment 90 last time, and output the control information to the control-target equipment 90 when there is a change in the control information. For example, the control information generation unit 343 outputs the control information for changing the control-target equipment 90 to ON state at the time when the user with the ID which is associated with the control-target equipment 90 is judged to have intruded from the state which is not intruded to the specific area. In this case, while the user intrudes the specific area successively, the control information generation unit 343 does not output the control information. Then, the control information generation unit 343 outputs the control information for changing the control-target equipment 90 to OFF state at the time the user is judged to have gone away from the specific area. While the user does not intrude the specific area successively, the control information generation unit 343 does not output the control information.

And, the control information generation unit 343 may associate an intermediate state other than the ON/OFF of the control-target equipment 90 with the parameter included in the specific area intrusion information. In this case, the control information generation unit 343 outputs the control information for making the state transition via the intermediate state when it changes the state of the control-target equipment 90 from ON to OFF or OFF to ON based on the parameter included in the specific area intrusion information. For example, when the control-target equipment 90 is a light which can control illumination intensity, the control information generation unit 343 may associates the bigness and the smallness of the illumination intensity with the bigness and the smallness of a parameter representing a distance of the user to the light. On the basis of this correspondence, the control information generation unit 343 can control such that the illumination intensity is brought close to the maximum as the user of the ID associated with the light approaches the poison of the light (as the parameter approaches 1), and the illumination intensity is brought close to 0 as the user approaches the boundary of the specific area (as the parameter approaches 0).

And, when specific area intrusion information about a plurality of IDs which is associated with one control-target equipment 90 is acquired, the control information generation unit 343 may generate the control information using the number (the number of intruded people) of the IDs which is associated with the specific area intrusion information. In this case, the control information generation unit 343 stores the association of this number of intruding people with the state of the control-target equipment 90 in advance.

For example, when the control-target equipment 90 is air conditioning, the control information generation unit 343 operates as explained in the following. When the number of intruded people is smaller than a predetermined threshold value, the control information generation unit 343 associates it with the state of an intermittent operation. And, when the number of intruded people is the threshold value or over, the control information generation unit 343 associates it with the state of a normal operation.

Operation of the equipment control system 3 structured as above will be explained with reference to FIG. 9.

Further, in FIG. 9, it is supposed that the equipment layout information storage unit 31 and the related ID information storage unit 12 already store the equipment layout information and the related ID information. And, it is supposed that the specific area intrusion detection unit 342 refers to the equipment layout information stored in the equipment layout information storage unit 31, already decides the specific area of the control-target equipment 90, and stores it.

First, the ID-affixed trajectory information acquisition unit 13 acquires the ID-affixed trajectory information (Step S11).

Next, the related ID matching unit 341 outputs matching result information representing whether or not there is related ID information including the ID in the ID-affixed trajectory information on the basis of matching between the ID-affixed trajectory information and the related ID information stored in the related ID information storage unit 12 (Step S12).

When the matching result information is that there is no related ID information which includes the ID in the ID-affixed trajectory information (No in Step S13), the equipment control system 3 ends the operation.

When the matching result information represents that there is related ID information including the ID in the ID-affixed trajectory information (Yes in Step S13), the specific area intrusion detection unit 342 acquires the specific area of the control-target equipment 90 which the related ID information shows. Then, the specific area intrusion detection unit 342 generates specific area intrusion information on the basis of the ID-affixed trajectory information and the specific area (Step S14).

At this time, as described above, the specific area intrusion detection unit 342 may judge whether or not positional information of a predetermined period included in the ID-affixed trajectory information is included in the specific area. And, in that case, the specific area intrusion detection unit 342 may change the predetermined period which becomes intrusion judgment criterion, or expand or shrink the specific area by using the passing speed or the passing direction in the crossing time of the boundary area of the user with the ID on the basis of the ID-affixed trajectory information.

When the specific area intrusion detection unit 342 judges that the ID-affixed trajectory information satisfies the predetermined intrusion judgment criterion for the specific area, it generates specific area intrusion information representing that the specific area is intruded. On the other hand, when the specific area intrusion detection unit 342 judges that the ID-affixed trajectory information does not satisfy the predetermined intrusion judgment criterion for the specific area, it generates specific area intrusion information representing that the specific area is not intruded. Further, the specific area intrusion detection unit 342 may include a parameter representing a degree of intrusion to the specific area of the user with the ID in the specific area intrusion information.

Next, the control information generation unit 343 decides a state of the control-target equipment 90 on the basis of the specific area intrusion information generated in Step S14. (Step S15). At this time, the control information generation unit 343 may judge whether or not the user of the ID intrudes the specific area on the basis of the specific area intrusion information generated in Step S14, and decide ON state or OFF state of the control-target equipment 90. And, the control information generation unit 343 may decide the intermediate state of the control-target equipment 90 on the basis of the parameter included in the specific area intrusion information generated in Step S14. And, the control information generation unit 343 may decide the state of the control-target equipment 90 on the basis of the number of intruded people which is associated with the specific area intrusion information representing that the specific area of the control-target equipment 90 is intruded.

Next, the control information generation unit 343 outputs to the control-target equipment 90 the control information which controls it so as to become the state which was decided in Step S15 (Step S16).

Then, the control-target equipment 90 changes the state in accordance with the control information.

As above, the equipment control system 3 ends the operation.

Next, in such equipment control system 3, a case when a blind is applied to the control-target equipment 90 will be explained.

The equipment layout information storage unit 31 stores, in addition to the positional information of each blind, a use area including a desk arranged beside a window where the blind is installed.

The related ID information storage unit 12 stores the related ID information which associates the identification information of each blind with an ID of a user of each desk arranged beside the window where the blind is installed.

The specific area intrusion detection unit 342 refers to the equipment layout information storage unit 31, decides an area of the window-side of the blind as the specific area of each blind, and holds it.

Then, when the ID-affixed trajectory information acquisition unit 13 acquires the ID-affixed trajectory information, the related ID matching unit 341 matches the ID-affixed trajectory information and the related ID information stored in the related ID information storage unit 12. Here, when there is a blind which is associated with the ID in the ID-affixed trajectory information, the specific area intrusion detection unit 342 generates specific area intrusion information of the ID on the basis of the ID-affixed trajectory information and the specific area of the blind. Here, when there is a plurality of users in an office (management target space), there is a case when a plurality of ID-affixed trajectory information is acquired. When the specific area intrusion detection unit 342 acquires a plurality of ID-affixed trajectory information, it generates a plurality of specific area intrusion information. Then, when there is no specific area intrusion information representing intrusion in the specific area of a certain blind, the control information generation unit 343 outputs the control information for making the blind an open state. On the other hand, when there is one or more specific area intrusion information representing intrusion in the specific area of a certain blind, the control information generation unit 343 outputs the control information for making the blind to a closed state. On the basis of such control, the equipment control system 3 can control such as to close the blind installed on the window when a user exists on the desk around the window, and to open the blind when no user exists on the desk around the window. On the basis of this control, the equipment control system 3 opens the blind when there is no user on the desk around the window, makes a light unnecessary, and suppresses power consumption caused by the light.

On the other hand, the equipment control system 3 closes the blind when there is a user on the desk around the window, and improves visibility of a display. Then, even if a user other than the user of the desk around the window approaches the blind, the equipment control system 3 does not control the blind.

Next, effect of the third exemplary embodiment of the present invention is described.

The equipment control system 3 of the third exemplary embodiment of the present invention can control the appropriate control-target equipment 90 in accordance with detection of a user.

The reason is because, in addition to the related ID information storage unit 12 storing the ID of the user related to the control-target equipment 90, the specific area intrusion detection unit 342 decides the appropriate specific area for the position of the user when the state of the control-target equipment 90 is controlled. Then, because the control information generation unit 343 controls the state of the control-target equipment 90 on the basis of whether or not the ID-affixed trajectory information of the user with the ID associated with the control-target equipment 90 satisfies the intrusion judgment criterion for the specific area.

On the basis of this control, the equipment control system 3 of the third exemplary embodiment of the present invention can realize more effective reduction of power consumption since it controls the control-target equipment 90 when an appropriate user approaches the target equipment for use. And, the equipment control system 3 of the third exemplary embodiment of the present invention can prevent wasteful control of the control-target equipment 90 and can improve the energy saving effect further on the basis of detection of the user who does not use the control-target equipment 90 since it can decide the specific area flexibly in the light of factors such as the layout of the control-target equipment 90.

Figure 10:
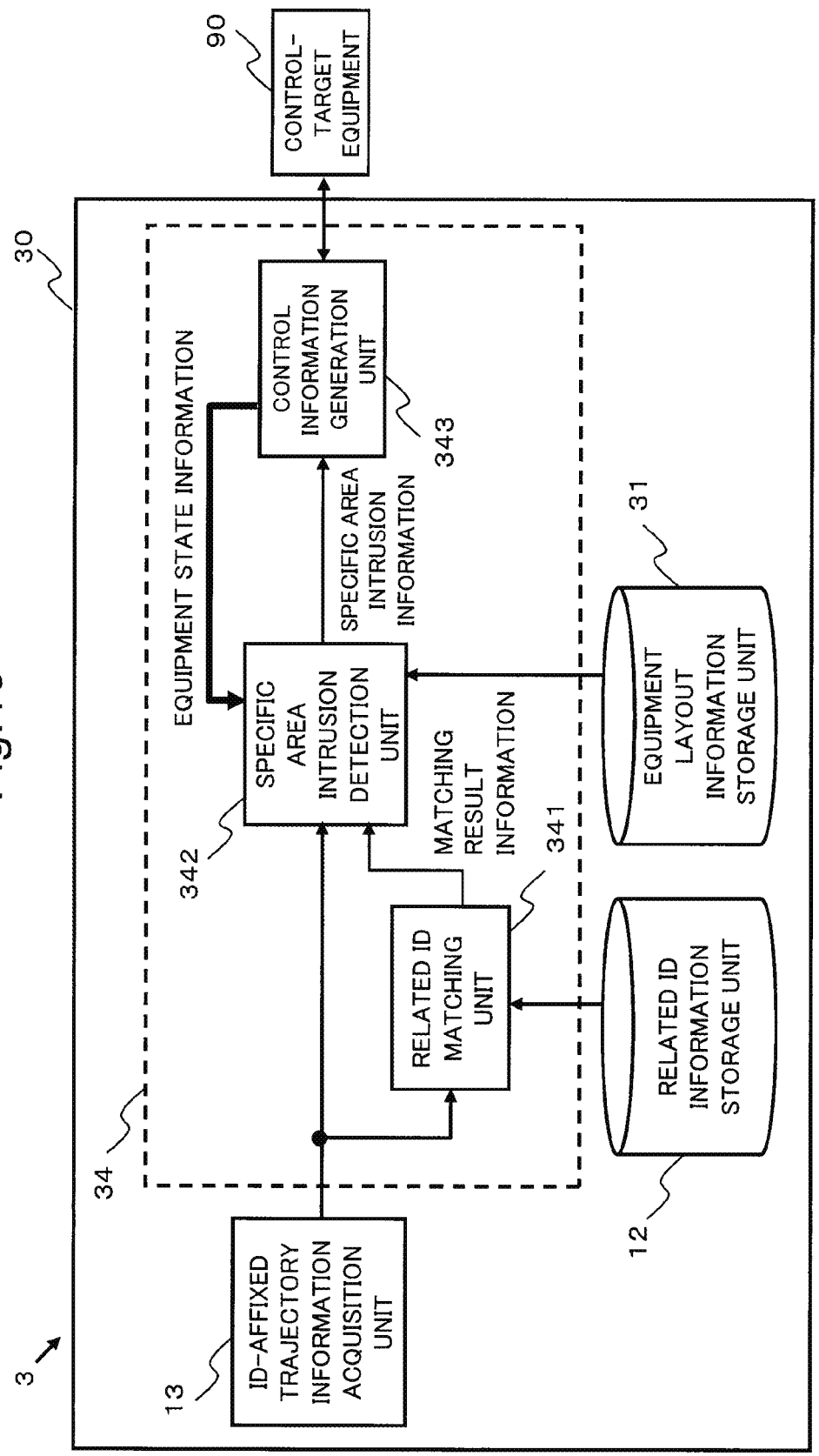
FIG. 10 is a figure showing another mode of the equipment control system of the third exemplary embodiment of the present invention.

Further, in the third exemplary embodiment of the present invention, as shown in FIG. 10, the equipment control unit 34 may consider current equipment state information of the control-target equipment 90 and decide the state of the control-target equipment 90. Here, the current equipment state information of the control-target equipment 90 is information which can specify the current state of the control-target equipment 90, for example, such that the control-target equipment 90 is in an operating state, in a stopped state or in an intermediate state. In this case, the control information generation unit 343 acquires the current state from the control-target equipment 90 and outputs the equipment state information to the specific area intrusion detection unit 342. Further, the specific area intrusion detection unit 342 may change the intrusion judgment criterion on the basis of the current equipment state information of the control-target equipment 90. For example, the specific area intrusion detection unit 342 may change the boundary of the specific area on the basis of the current equipment state information of the control-target equipment 90.

Concretely, the specific area intrusion detection unit 342 may change the boundary of the specific area when the control-target equipment 90 is in the stopped state to outside of the boundary of the specific area when the control-target equipment 90 is in the operating state.

On the basis of such structure, the equipment control system 3 of the third exemplary embodiment of the present invention can detect a user approaching the target equipment more quickly using the intrusion judgment criterion in which the specific area is set larger when the control-target equipment 90 is in the stopped state, and control it to the operating state.

On the other hand, the equipment control system 3 of the third exemplary embodiment of the present invention can detect the user going away immediately using the intrusion judgment criterion in which the specific area is set smaller when the control-target equipment 90 is in the operating state, and control it to the stopped state.

For example, when the control-target equipment 90 is a light, the specific area intrusion detection unit 342 can control as follows.

When the current state of the light is ON, the specific area intrusion detection unit 342 can set the boundary of the specific area to inside by a predetermined margin, detect the user who leaves the desk more quickly and turn the light off.

On the other hand, when the current light state is OFF, the specific area intrusion detection unit 342 can set the boundary of the specific area to outside by a predetermined margin, detect the user who is going to be seated more quickly and turn the light on.

When the control-target equipment 90 is a PC, a printer or a blind, the equipment control system 3 can control similarly.

(The Fourth Exemplary Embodiment)

Next, the fourth exemplary embodiment of the present invention will be explained in detail with reference to drawings. Further, in each drawing referred to in the explanation of this exemplary embodiment, a structure similar to the first exemplary embodiment of the present invention and a step which operates similarly are attached an identical code and detailed explanation in this exemplary embodiment is omitted.

Figure 11:
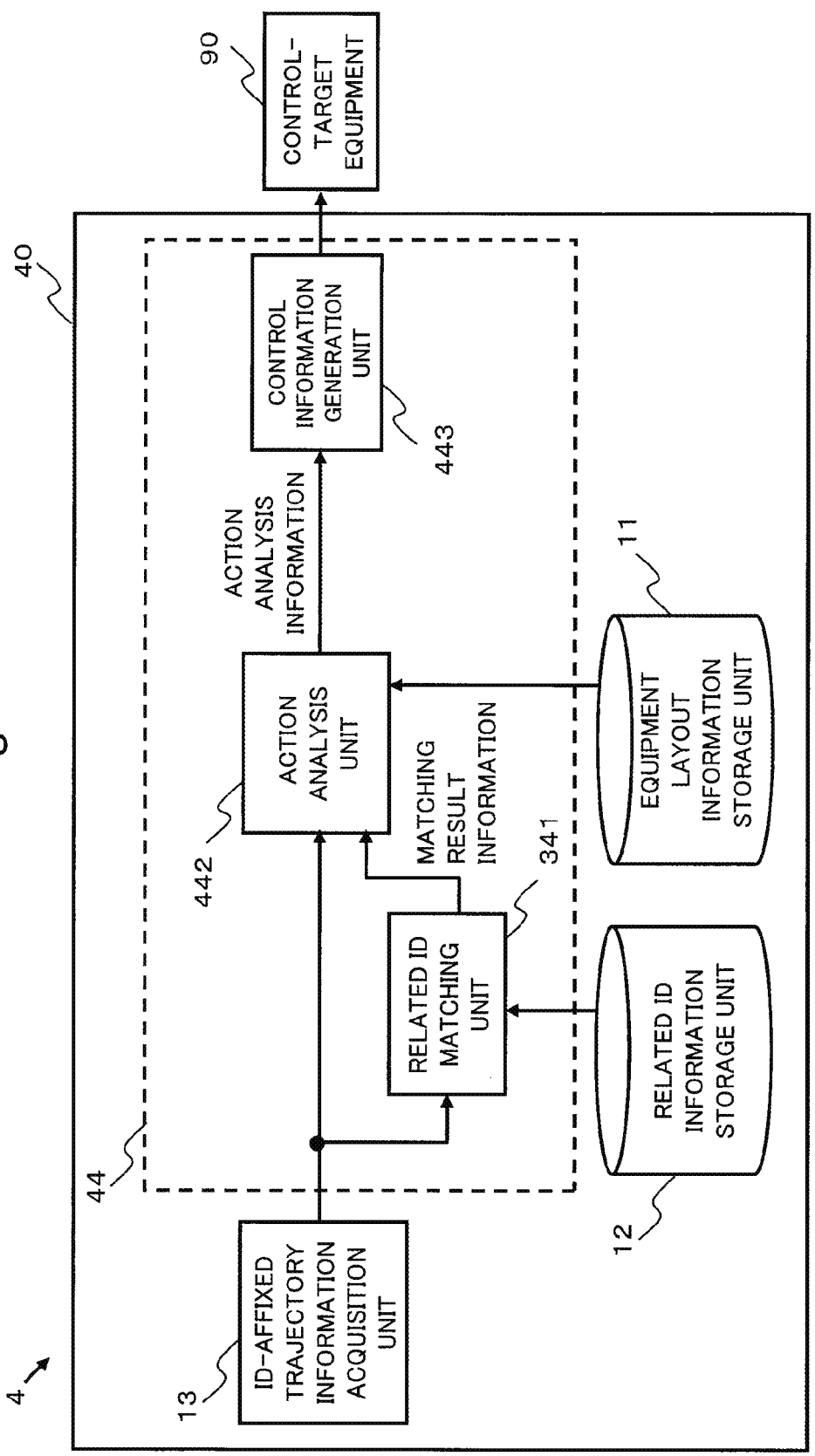
FIG. 11 is a block diagram showing a function of an equipment control system of a fourth exemplary embodiment of the present invention.

First, a structure of an equipment control system 4 of the fourth exemplary embodiment of the present invention is shown in FIG. 11. In FIG. 11, the equipment control system 4 includes an equipment control device 40 and the control-target equipment 90. Here, the equipment control device 40 can be structured, for example, similarly to the equipment control device 10 of the first exemplary embodiment of the present invention, using the computer device as shown in FIG. 2. Further, although one control-target equipment 90 is shown in FIG. 11, this does not limit the number of the control-target equipment 90 included in the equipment control system 4 of the fourth exemplary embodiment of the present invention. The equipment control device 40 can connect with the two or over control-target equipments 90 and control each equipment.

The equipment control device 40 is different from the equipment control device 10 of the first exemplary embodiment of the present invention in a point that it includes an equipment control unit 44 instead of the equipment control unit 14.

The equipment control unit 44 includes the related ID matching unit 341, an action analysis unit 442 and a control information generation unit 443.

The related ID matching unit 341 outputs the matching result information representing whether or not there is related ID information including the ID in the ID-affixed trajectory information.

The action analysis unit 442 analyzes the ID-affixed trajectory information and the equipment layout information when the related ID matching unit 341 judges that there is related ID information including the ID in the ID-affixed trajectory information. Then, the action analysis unit 442 outputs action analysis information representing a type of an action for the control-target equipment 90 of the user with the ID to the control information generation unit 443.

For example, the action analysis unit 442 judges whether or not time series of the positional information of the ID-affixed trajectory information for the positional information of the control-target equipment 90 fall under either action patterns stored in an action pattern dictionary. Then, when the action analysis unit 442 judges that time series falls under one of action patterns, it outputs an index given to the action pattern as the action analysis information.

For example, when the control-target equipment 90 is equipment installed around a user's desk such as a personal computer or light, the action analysis unit 442 operates as follows.

When each positional information which is included in the ID-affixed trajectory information of the ID associated with the control-target equipment 90 is approximately identical in an area of neighborhood of the control-target equipment 90, the action analysis unit 442 judges that it matches the action pattern of being seated and working. Then, the action analysis unit 442 outputs the index representing the action of being seated and working as the action analysis information.

And, for example, around the boundary where neighborhood areas of two control-target equipments 90 included in the equipment layout information are adjacent each other, when the ID-affixed trajectory information of the ID associated with each control-target equipment 90 is included respectively, the action analysis unit 442 judges that people next to each other are consulting. Then, the action analysis unit 442 outputs the index representing the action which represents being in consultation as the action analysis information.

And, for example, the action analysis unit 442 may judge whether it is temporal leave from his/her desk to leave the control-target equipment 90 temporarily or long-term leave from his/her desk on the basis of the ID-affixed trajectory information and the equipment layout information.

The control information generation unit 443 decides a state of the control-target equipment 90 on the basis of the action analysis information outputted from the action analysis unit 442. Then, the control information generation unit 443 generates control information by which the control-target equipment 90 becomes the decided state, and outputs it.

For example, when the control-target equipment 90 is a light whose illumination intensity can be controlled, the control information generation unit 443 operates as explained in the following.

When the action analysis information represents being seated and working, the control information generation unit 443 generates the control information for making the illumination intensity of the light 100%. On the other hand, when the action analysis information does not represent being seated and working, the control information generation unit 443 generates the control information for making illumination intensity (for example, 70%) lower than being seated and working. Moreover, for example, when the action analysis information represents long-term leave from his/her desk, the control information generation unit 443 generates the control information for turning the light to OFF state. On the other hand, when the action analysis information represents temporal leave from his/her desk, the control information generation unit 443 generates the control information for not turning the light to OFF state, but lowering the illumination intensity.

Figure 12:
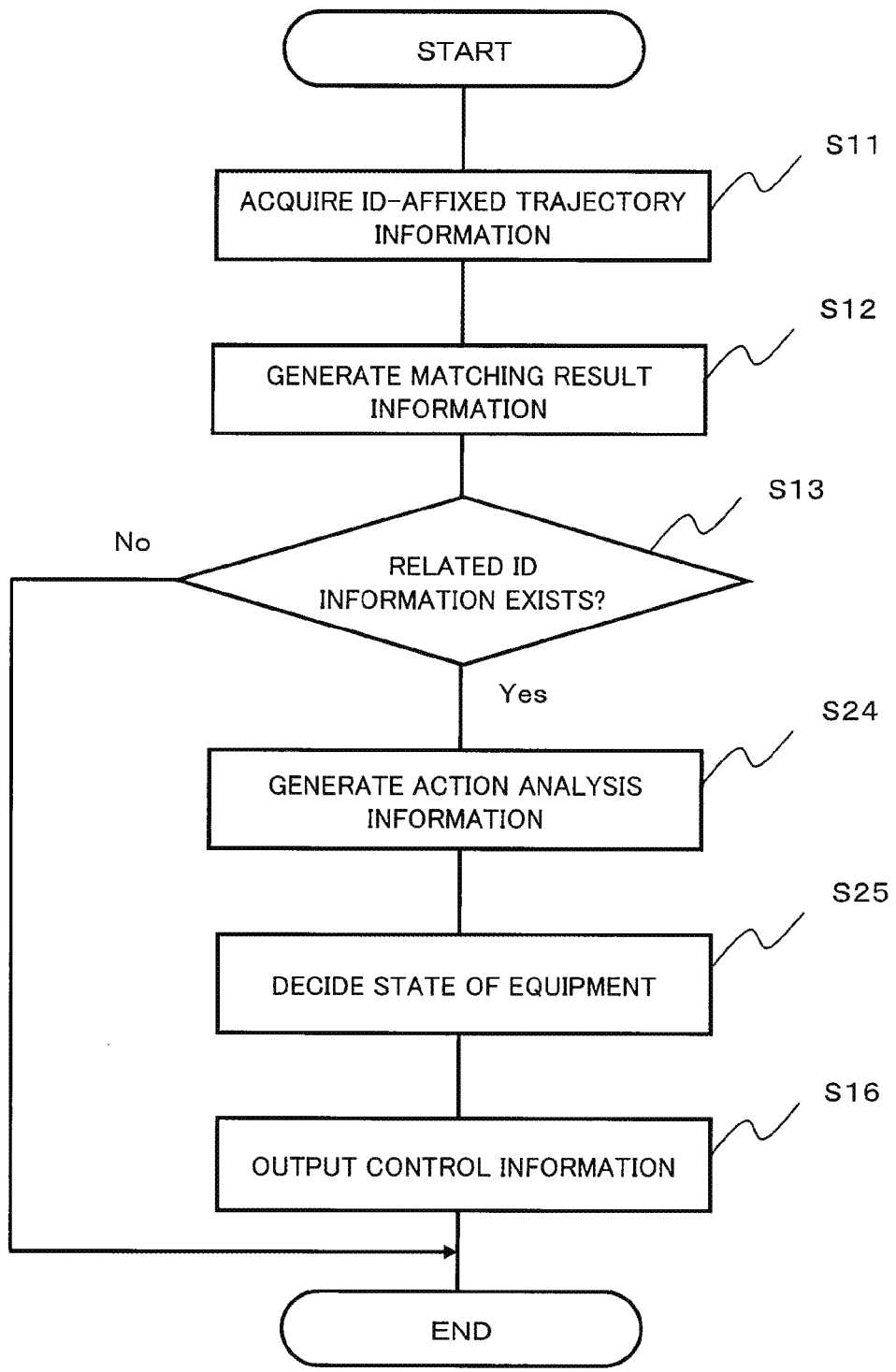
FIG. 12 is a flow chart explaining operation of the equipment control system of the fourth exemplary embodiment of the present invention.

Operation of the equipment control system 4 structured as above will be explained with reference to FIG. 12. Further, in FIG. 12, it is supposed that the equipment layout information storage unit 11 and the related ID information storage unit 12 already store the equipment layout information and the related ID information.

First, the equipment control system 4 operates up to Steps S11-S13 similarly to the third exemplary embodiment of the present invention, and outputs matching result information representing whether or not there is related ID information including the ID in the ID-affixed trajectory information.

Here, when the matching result information is that there is no related ID information which includes the ID in the ID-affixed trajectory information (No in Step S13), the equipment control system 4 ends the operation.

When the matching result information represents that there is related ID information including the ID in the ID-affixed trajectory information (Yes in Step S13), the action analysis unit 442 analyzes the ID-affixed trajectory information and the equipment layout information, and outputs the action analysis information (Step S24).

Next, the control information generation unit 443 decides a state of the control-target equipment 90 on the basis of the action analysis information generated in Step S24. (Step S25).

Next, the control information generation unit 443 outputs control information for making the control-target equipment 90 the state decided in Step S25 (Step S16).

Then, the control-target equipment 90 changes the state in accordance with the control information.

As above, the equipment control system 4 ends the operation.

Next, effect of the fourth exemplary embodiment of the present invention is described.

The equipment control system 4 of the fourth exemplary embodiment of the present invention can control more appropriately control-target equipment 90 according to the user's action.

The reason is because, in addition to the related ID information storage unit 12 storing the ID of the user related to the control-target equipment 90, the action analysis unit 442 analyzes the ID-affixed trajectory information of the user and the equipment layout information, and analyzes the type of the action of the user. Then, because the control information generation unit 443 controls the state of the control-target equipment 90 on the basis of the type of the action.

On the basis of this control, because the equipment control system 4 of the fourth exemplary embodiment of the present invention can control the state of the control-target equipment 90 in detail in accordance with the kind of action the appropriate user of the control-target equipment 90 takes and the location of the user to the equipment.

Figure 13:
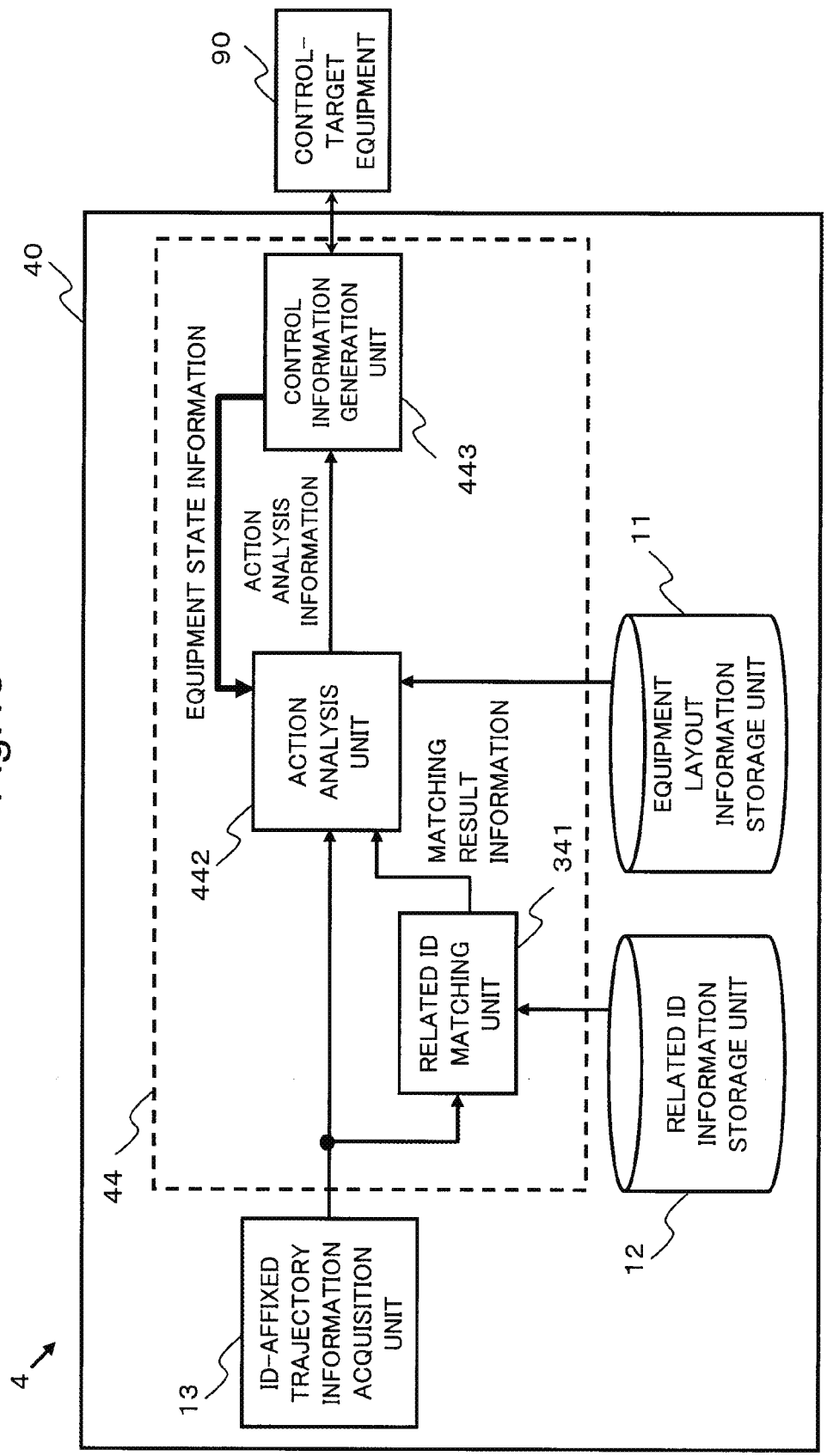
FIG. 13 is a figure showing another mode of the equipment control system of the fourth exemplary embodiment of the present invention.

Further, in the fourth exemplary embodiment of the present invention, as shown in FIG. 13, the equipment control unit 44 may decide the state of the control-target equipment 90 by considering the current equipment state information of the control-target equipment 90. Here, the current equipment state information of the control-target equipment 90 is information of a state such that, for example, the control-target equipment 90 is in the operating state, in the stopped state or in the intermediate state. The control information generation unit 443 shown in FIG. 13 acquires the current equipment state information from the control-target equipment 90 and outputs it to the action analysis unit 442. Then, the action analysis unit 442 may change the action pattern dictionary used for action analysis on the basis of the current equipment state information of the control-target equipment 90.

For example, it is supposed that the action analysis unit 442 stores, in advance, a dictionary A storing the action pattern in which a user approaches the equipment and a dictionary B storing the action pattern in which a user goes away from the equipment as a model of the action pattern. In this case, when the equipment is in the stopped state, the action analysis unit 442 applies the dictionary A to the ID-affixed trajectory information, and detects whether or not the user is approaching the equipment. On the other hand, when the equipment is in the operating state, the action analysis unit 442 applies the dictionary B to the ID-affixed trajectory information, and detects whether or not the user is going away from the equipment.

Further, the model of such action pattern can be built using a discriminator which is not illustrated and learns the ID-affixed trajectory information corresponding to a typical action pattern.

On the basis of such a structure, the equipment control system 4 of the fourth exemplary embodiment of the present invention can analyze appropriately the action of the user who uses the equipment using the dictionary of the action pattern of approaching the equipment, and control the equipment into the operating state when the control-target equipment 90 is in the stopped state. On the other hand, the equipment control system 4 of the fourth exemplary embodiment of the present invention can analyze appropriately the action of the user who has finished using the equipment using the dictionary of the action pattern of going away from the equipment, and control the equipment to the stopped state when the control-target equipment 90 is in the operating state.

(The Fifth Exemplary Embodiment)

Next, the fifth exemplary embodiment of the present invention will be explained in detail with reference to drawings. Further, in each drawing referred to in the explanation of this exemplary embodiment, a structure similar to the third exemplary embodiment of the present invention and a step which operates similarly are attached an identical code and detailed explanation in this exemplary embodiment is omitted.

Figure 14:
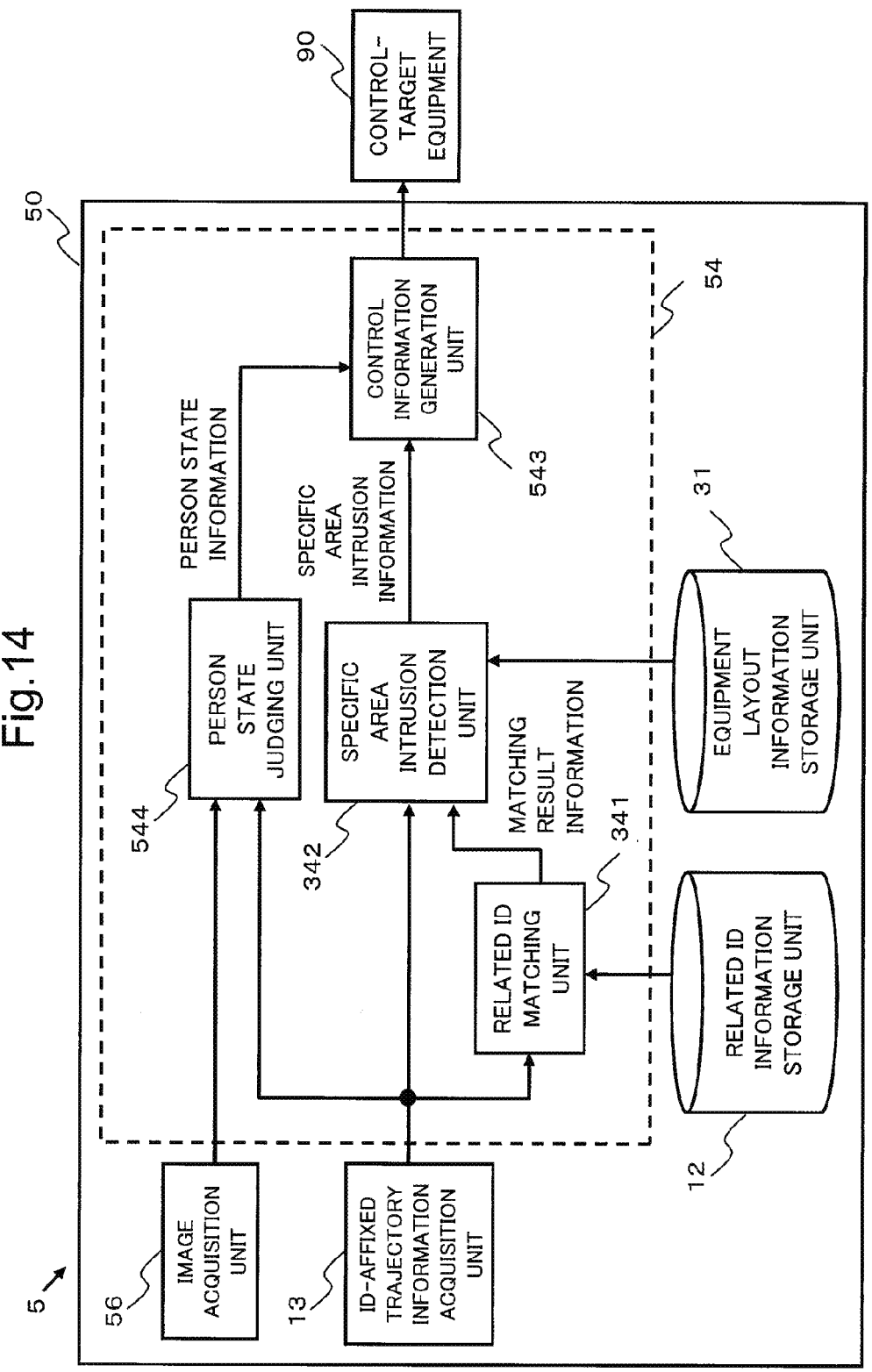
FIG. 14 is a block diagram showing a function of an equipment control system of a fifth exemplary embodiment of the present invention.

First, a structure of an equipment control system 5 of the fifth exemplary embodiment of the present invention is shown in FIG. 14. In FIG. 14, the equipment control system 5 includes an equipment control device 50 and the control-target equipment 90. Here, the equipment control device 50 can be structured, for example, similarly to the equipment control device 30 of the third exemplary embodiment of the present invention, using the computer device as shown in FIG. 2. Further, although one control-target equipment 90 is shown in FIG. 14, this does not limit the number of the control-target equipment 90 included in the equipment control system 5 of the fifth exemplary embodiment of the present invention. The equipment control device 50 can connect with the two or over control-target equipments 90 and control each equipment.

The equipment control device 50 is different from the equipment control device 30 of the third exemplary embodiment of the present invention in a point that it includes an equipment control unit 54 instead of the equipment control unit 34, and includes an image acquisition unit 56 moreover. And, the equipment control unit 54 is different from the equipment control unit 34 in the third exemplary embodiment of the present invention in a point that it includes a control information generation unit 543 instead of the control information generation unit 343, and includes a person state judging unit 544 moreover.

The image acquisition unit 56 acquires a video image from an imaging device which is not illustrated. This imaging device is installed so that it captures images of the management target space. Further, the image acquisition unit 56 may acquire a plurality of images from a plurality of imaging devices.

The person state judging unit 544 associates the ID-affixed trajectory information acquired by the ID-affixed trajectory information acquisition unit 13 with the image acquired by the image acquisition unit 56. Further, the person state judging unit 544 calculates correspondence relationship between individual coordinate values on the image and coordinates in the management target space in advance, and associates the ID-affixed trajectory information with the image. Then, the person state judging unit 544 extracts a person region corresponding to the ID-affixed trajectory information in the image.

Various related technologies can be applied to the process of extraction the person region in the person state judging unit 544. For example, the person state judging unit 544 may create an image (background model) which is a model of background, extract a foreground region on the basis of difference between the background model and the image, and detect the person region from the foreground region. Or, the person state judging unit 544 may extract the person region on the basis of detection of a region of a body of a person such as a head and an upper part of body. The person state judging unit 544 can extract the person region using various technologies other than that.

And, the person state judging unit 544 analyzes time series variation of the person region extracted from the image, and judges the state of the person on the basis of the time series variation. For example, the person state judging unit 544 may judge a state of posture that is standing or sitting as the state of the person. Or, the person state judging unit 544 may judge whether or not the person is in a state of going out or going home on the basis of discrimination of putting on or off a jacket or a type of a jacket. Or, the person state judging unit 544 may judge whether or not it is a state of having a belonging such as a bag. On the basis of such judgment, the person state judging unit 544 outputs person state information representing the state of the person who is detected using the image to the control information generation unit 543.

The control information generation unit 543 decides a state of the control-target equipment 90 on the basis of the specific area intrusion information outputted from the specific area intrusion detection unit 342 and the person state information outputted from the person state judging unit 544. For this reason, the control information generation unit 543 stores correspondence of combination of the specific area intrusion information and the person state information, and the state of the control-target equipment 90, in advance. Then, the control information generation unit 543 generates control information for controlling the control-target equipment 90 to be in the state decided, and outputs it to the control-target equipment 90.

Operation of the equipment control system 5 structured as above will be explained with reference to FIG. 15.

Figure 15:
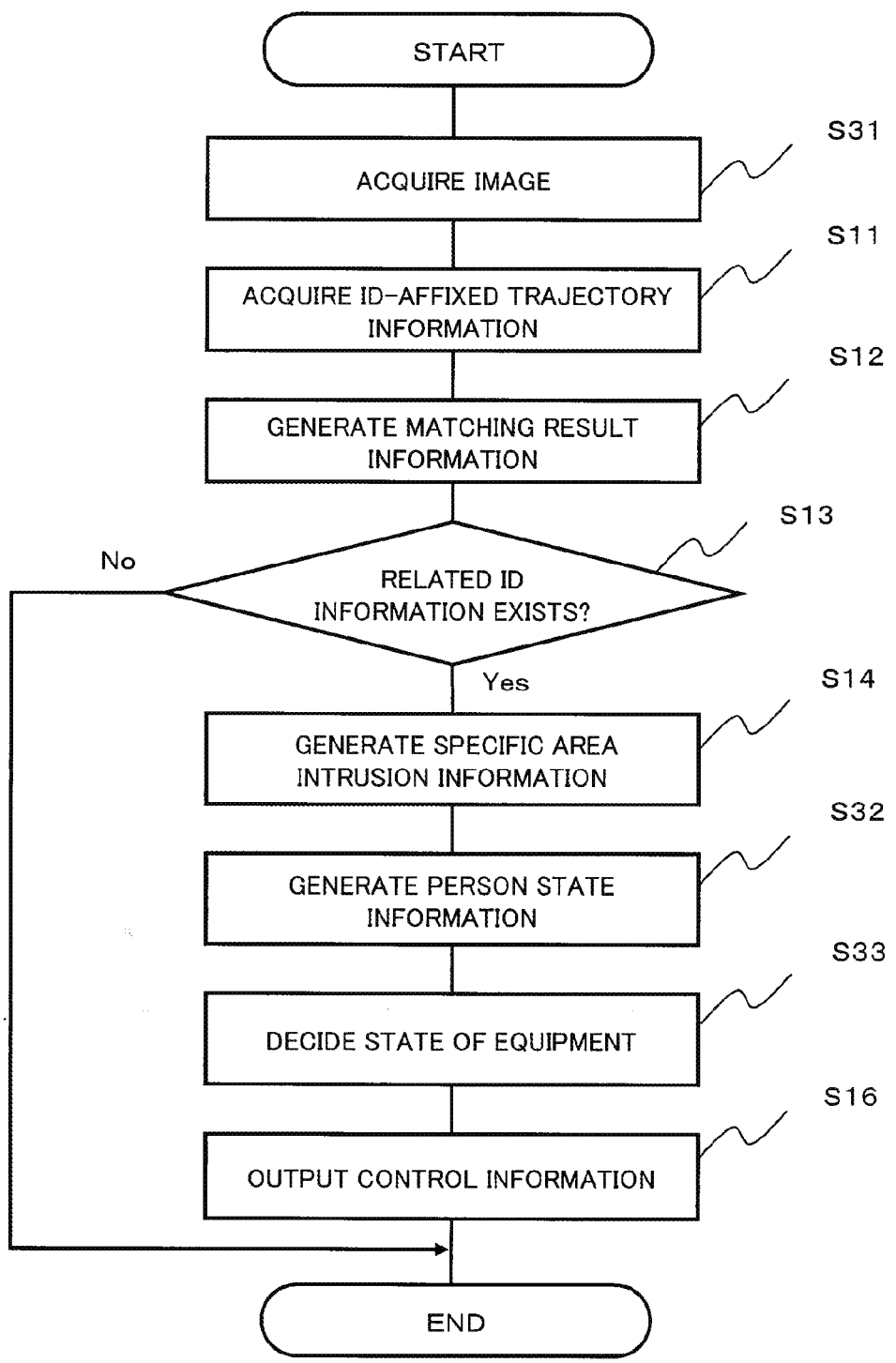
FIG. 15 is a flow chart explaining operation of the equipment control system of the fifth exemplary embodiment of the present invention.

Further, in FIG. 15, it is supposed that the equipment layout information storage unit 31 and the related ID information storage unit 12 already store the equipment layout information and the related ID information. And, it is supposed that the specific area intrusion detection unit 342 refers to the equipment layout information stored in the equipment layout information storage unit 31, already specifies the specific area of the control-target equipment 90 and stores it.

First, the image acquisition unit 56 acquires an image in which the management target space is captured (Step S31).

Next, the process from Step S11 to Step S14 is operated similarly in the equipment control system 3 of the third exemplary embodiment of the present invention, and the specific area intrusion detection unit 342 generates specific area intrusion information.

Next, the person state judging unit 544 associates the ID-affixed trajectory information acquired in Step S11 with the image acquired in Step S31, extracts a person region, and generates person state information representing the state of the person (Step S32).

Next, the control information generation unit 543 decides a state of the control-target equipment 90 on the basis of the specific area intrusion information generated in Step S14 and the person state information generated in Step S32. (Step S33).

Next, the control information generation unit 543 generates control information by which the control-target equipment 90 becomes the state decided in Step S33, and outputs it (Step S16).

Then, the control-target equipment 90 changes the state in accordance with the control information.

As above, the equipment control system 5 ends the operation.

Next, in such equipment control system 5, a case when a blind is applied to the control-target equipment 90 will be explained.

It is supposed that the specific area intrusion detection unit 342 generated specific area intrusion information representing that a user with the ID associated with the blind intruded the specific area (around a window) of this blind. In this case, the person state judging unit 544 judges by using the image whether or not a person on a desk around the window where the blind is installed is working facing a display. Here, when the control information generation unit 543 judges the person state to be working facing the display, it outputs control information for closing the blind. On the other hand, when the control information generation unit 543 does not judge to be working facing the display, it outputs control information for keeping the blind open. On the basis of this control, even if a user with the ID associated with the blind exists around the window, when the user is not facing the display, the blind is controlled in the open state. Or, the person state judging unit 544 may judge whether a person around the window of the blind is standing or sitting. In case of this judgment, even if the control information generation unit 543 detects a user with the ID associated with the blind in the specific area, when it judges that the person state is a standing state, it may output control information for opening the blind.

The equipment control system 5 can similarly control the control-target equipment 90 other than the blind such as a light by considering the person state. However, when the control-target equipment 90 is a blind, since much electric power is consumed on the basis of the control when ON/OFF is frequently repeated, the equipment control system 5 may set granularity of control coarse compared with a case when other equipment such as a light is applied.

Next, effect of the fifth exemplary embodiment of the present invention is described.

The equipment control system 5 of the fifth exemplary embodiment of the present invention can control more appropriately control-target equipment 90 in accordance with the state of a person.

The reason is because, in addition to the specific area intrusion detection unit 342 detecting the intrusion situation to the specific area of the appropriate user using the control-target equipment 90, the person state judging unit 544 judges the state of the user by using the image in which the management target space is captured. Then, because the control information generation unit 543 decides the state of the control-target equipment 90 by considering the person state information in addition to the specific area intrusion information.

On the basis of this control, the equipment control system 5 of the fifth exemplary embodiment of the present invention can, for example, decide the state of the equipment by considering not only the intrusion situation that the appropriate user of the control-target equipment 90 goes out from inside to outside of the specific area around the control-target equipment 90 but also whether carrying a bag or not as the state of the person at the time. For example, when the user who goes out of the specific area set for the light that is the control-target equipment 90 is in the state of carrying a bag, the equipment control system 5 of this exemplary embodiment changes the light into OFF state by determining that the user is going out. On the other hand, when the user who goes out of the specific area does not carry a bag, the equipment control system 5 of this exemplary embodiment sets the state in which the illumination intensity of the light is lowered as a temporal leave from his/her desk. Thus, the equipment control system 5 of the fifth exemplary embodiment of the present invention can control the state of the control-target equipment 90 more in detail by considering the state of the person in addition to the intrusion situation to the specific area.

Figure 16:
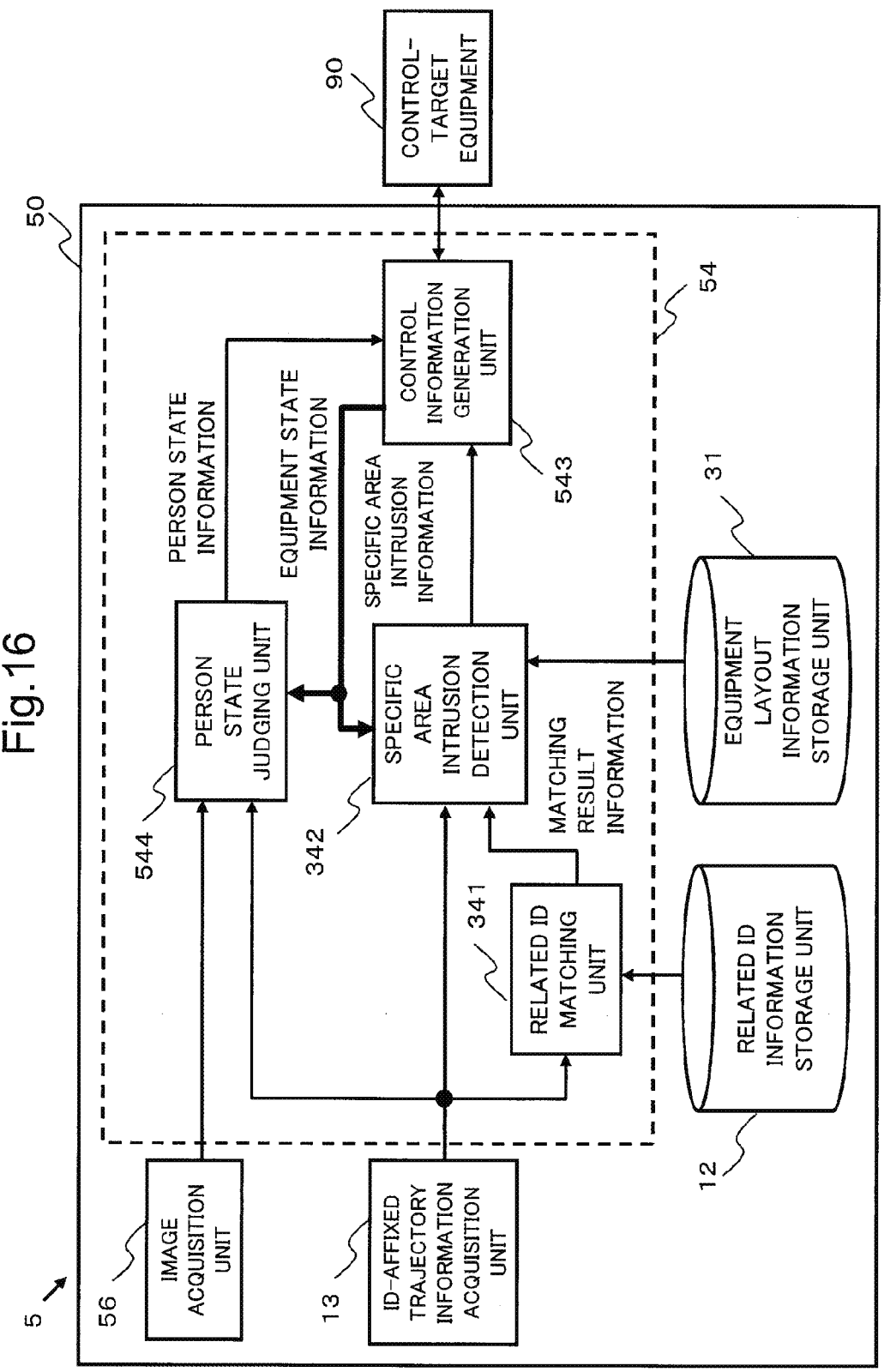
FIG. 16 is a figure showing another mode of the equipment control system of the fifth exemplary embodiment of the present invention.

Further, as shown in FIG. 16, the equipment control unit 54 in the fifth exemplary embodiment of the present invention may generate control information by considering the current equipment state information of the control-target equipment 90 similarly to the equipment control unit 34 in the third exemplary embodiment of the present invention.

In case of the equipment control unit 54 shown in FIG. 16, the control information generation unit 543 acquires the current equipment state information (for example, in the operating state or in the stopped state) from the control-target equipment 90, and outputs it to the specific area intrusion detection unit 342 and the person state judging unit 544. Then, the specific area intrusion detection unit 342 may change the boundary of the specific area on the basis of the current equipment state information of the control-target equipment 90. And, the person state judging unit 544 may change a judgment model which is used for judgment of the person state on the basis of the current equipment state information of the control-target equipment 90. For example, when the control-target equipment 90 is in the stopped state, the person state judging unit 544 may detect a sitting posture. And, when the control-target equipment 90 is in the operating state, the person state judging unit 544 may detect a standing posture.

On the basis of such a structure shown in FIG. 16, the equipment control system 5 of the fifth exemplary embodiment of the present invention can detect the sitting posture of the appropriate user in the specific area which is set rather larger, when the control-target equipment 90 is in the stopped state. Consequently, the equipment control system 5 of the fifth exemplary embodiment of the present invention can control the control-target equipment 90 so as to become the operating state at more appropriate timing. On the one hand, the equipment control system 5 of the fifth exemplary embodiment of the present invention can detect the standing posture of the appropriate user in the specific area which is set rather small, when the control-target equipment 90 is in the operating state. Consequently, the equipment control system 5 of the fifth exemplary embodiment of the present invention can control the control-target equipment 90 so as to become the stopped state at more appropriate timing.

(The Sixth Exemplary Embodiment)

Next, the sixth exemplary embodiment of the present invention will be explained in detail with reference to drawings. Further, in each drawing referred to in the explanation of this exemplary embodiment, a structure similar to the fourth exemplary embodiment of the present invention and a step which operates similarly are attached an identical code and a detailed explanation in this exemplary embodiment is omitted.

Figure 17:
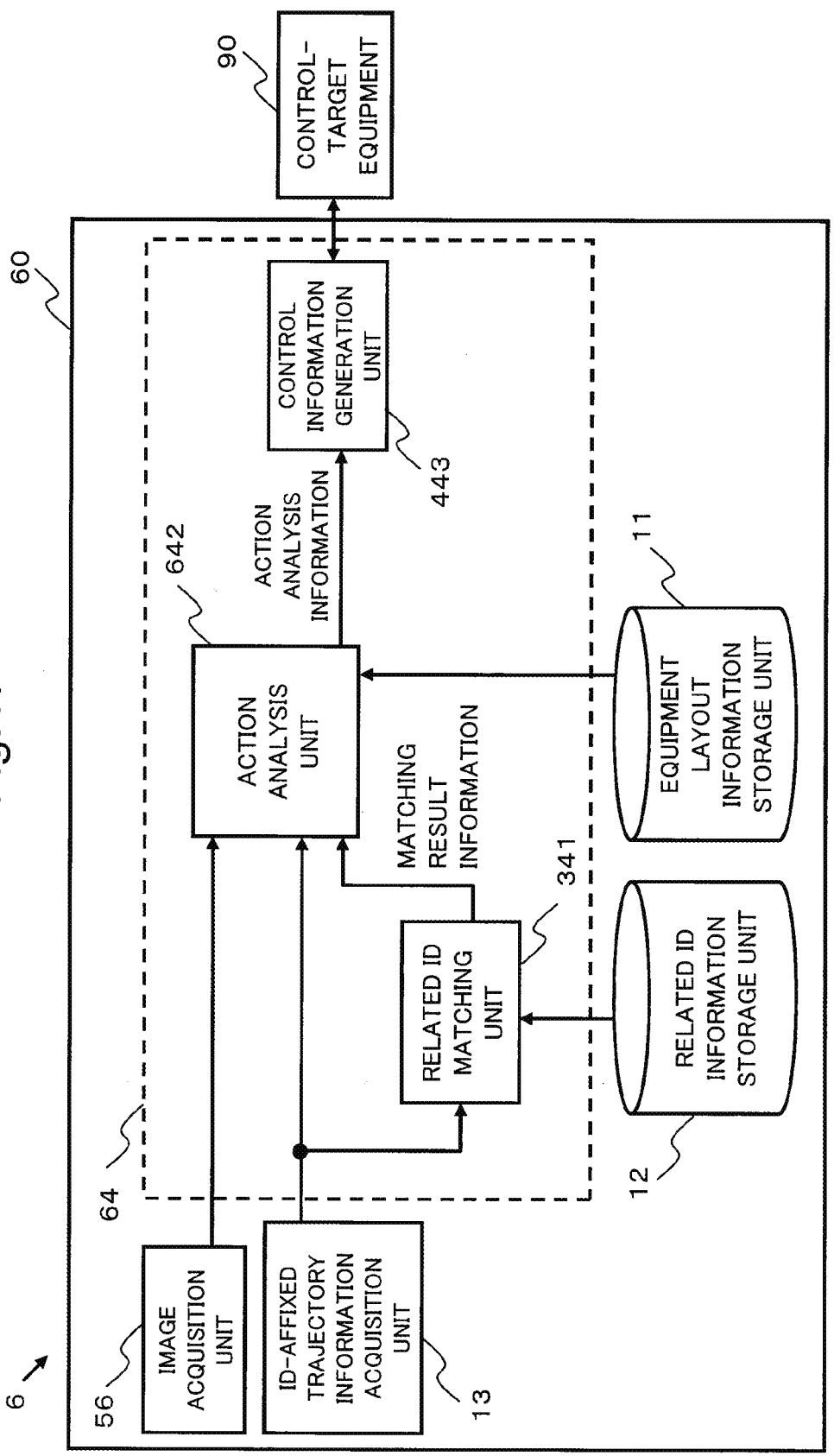
FIG. 17 is a block diagram showing a function of an equipment control system of a sixth exemplary embodiment of the present invention.

First, a structure of an equipment control system 6 of the sixth exemplary embodiment of the present invention is shown in FIG. 17. In FIG. 17, the equipment control system 6 includes an equipment control device 60 and the control-target equipment 90. Here, the equipment control device 60 can be structured, for example, similarly to the equipment control device 40 of the fourth exemplary embodiment of the present invention, using the computer device as shown in FIG. 2. Further, although one control-target equipment 90 is shown in FIG. 17, this does not limit the number of the control-target equipment 90 included in the equipment control system 6 of the sixth exemplary embodiment of the present invention. The equipment control device 60 can connect with the two or over control-target equipments 90 and control each equipment.

The equipment control device 60 is different from the equipment control device 40 of the fourth exemplary embodiment of the present invention in a point that it includes an equipment control unit 64 instead of the equipment control unit 44, and moreover includes the image acquisition unit 56. And, the equipment control unit 64 is different from the equipment control unit 44 in the fourth exemplary embodiment of the present invention in a point that it includes an action analysis unit 642 instead of the action analysis unit 442.

The image acquisition unit 56 is structured similarly to the image acquisition unit 56 in the fifth exemplary embodiment of the present invention.

The action analysis unit 642 analyzes the action of the user with the ID by using the image in addition to the ID-affixed trajectory information and the equipment layout information, when the related ID matching unit 341 judges that there is related ID information including the ID in the ID-affixed trajectory information. Then, the action analysis unit 642 outputs action analysis information representing classification of the action for the control-target equipment 90 of the user with the ID to the control information generation unit 443.

For example, it is supposed that the action analysis unit 642 applies the ID-affixed trajectory information and the equipment layout information to the action pattern dictionary, and detects the action that the user goes away from the control-target equipment 90.

In this case, the action analysis unit 642 judges whether the action of going away is long time leave from his/her desk or temporal leave from his/her desk by using the image.

For example, when time series of the person regions extracted from the image represent an action of a predetermined going-out preparation such as putting on a jacket, the action analysis unit 642 judges the long time leave from his/her desk.

On the other hand, for example, when time series of the person regions extracted from the image does not represent an action of the predetermined going-out preparation, the action analysis unit 642 judges the short time leave from his/her desk.

On the basis of the action analysis information representing this judgment, the control information generation unit 443 can output a control signal which changes the light to OFF state when the long time leave from his/her desk, and output the control signal which makes the illumination intensity of the light low when the temporal leave from his/her desk.

Further, the action analysis unit 642 may use a discriminator which is not illustrated and is made to learn the action pattern based on the ID-affixed trajectory information and the images in advance for the analysis of an action. And, the action analysis unit 642 may analyze an action by using a discriminator which is not illustrated and has a function of learning the action pattern by on-line based on the ID-affixed trajectory information and the images.

Figure 18:
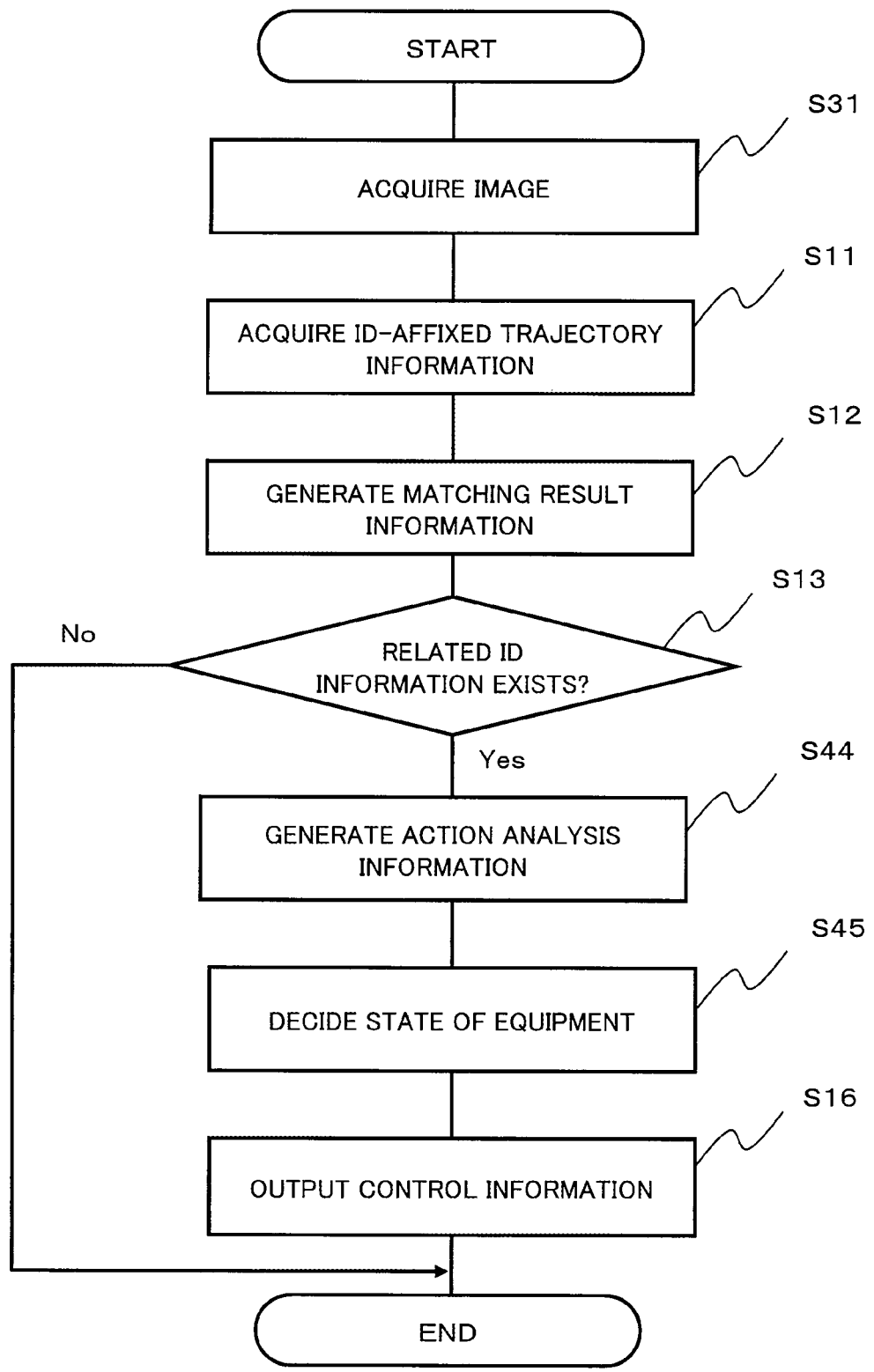
FIG. 18 is a flow chart explaining operation of the equipment control system of the sixth exemplary embodiment of the present invention.

Operation of the equipment control system 6 structured as above will be explained with reference to FIG. 18.

First, the image acquisition unit 56 acquires an image in which the management target space is captured (Step S31).

Next, the equipment control system 6 operates up to Steps S11-S12 similarly to the third exemplary embodiment of the present invention, and outputs matching result information representing whether or not there is related ID information including the ID in the ID-affixed trajectory information.

Here, when the matching result information is that there is no related ID information including the ID in the ID-affixed trajectory information (No in Step S13), the equipment control system 6 ends the operation.

When the matching result information is that there is related ID information including the ID in the ID-affixed trajectory information (Yes in Step S13), the action analysis unit 642 analyzes the ID-affixed trajectory information, the equipment layout information and the image acquired in Step S31, and outputs action analysis information (Step S44).

Next, the control information generation unit 443 decides a state of the control-target equipment 90 on the basis of the action analysis information generated in Step S44. (Step S45).

Next, the control information generation unit 443 outputs control information by which the control-target equipment 90 becomes the state decided in Step S45 (Step S16).

Then, the control-target equipment 90 changes the state following the control information.

As above, the equipment control system 6 ends the operation.

Next, effect of the sixth exemplary embodiment of the present invention is described.

The equipment control system 6 of the sixth exemplary embodiment of the present invention can control more appropriately control-target equipment 90 in accordance with an action of a user.

The reason is because the action analysis unit 642 analyzes the action of the appropriate user of the control-target equipment 90 by using the images in addition to the ID-affixed trajectory information and the equipment layout information. On the basis of this analysis, the equipment control system 6 of the sixth exemplary embodiment of the present invention can, for example, decide the state of the control-target equipment 90 on the basis of not only that the time series of the position of the appropriate user of the control-target equipment 90 shows the action pattern to go away from the control-target equipment 90, but also whether or not the person area extracted from the image represents the action of the going-out preparation. For example, when the user who is going away from the light of the control-target equipment 90 is in a state of putting on a jacket, the equipment control system 6 of this exemplary embodiment sets the light into OFF state by determining that the user is going out. On the other hand, when the user who is going outside of the specific area similarly does not put on a jacket, the equipment control system 6 of this exemplary embodiment changes the illumination intensity of the light to the lowered state as temporal leave from his/her desk. Thus, the equipment control system 6 of the sixth exemplary embodiment of the present invention can control the state of the control-target equipment 90 more in detail on the basis of the action analysis in consideration of the image in addition to the time series of the positional information of the user and the positional information of the equipment.

Moreover, the equipment control systems 6 of the sixth exemplary embodiment of the present invention can further improve the reduction effect of the power consumption of the control-target equipment 90 on the basis of more accurate control of the state of the control-target equipment 90.

Figure 19:
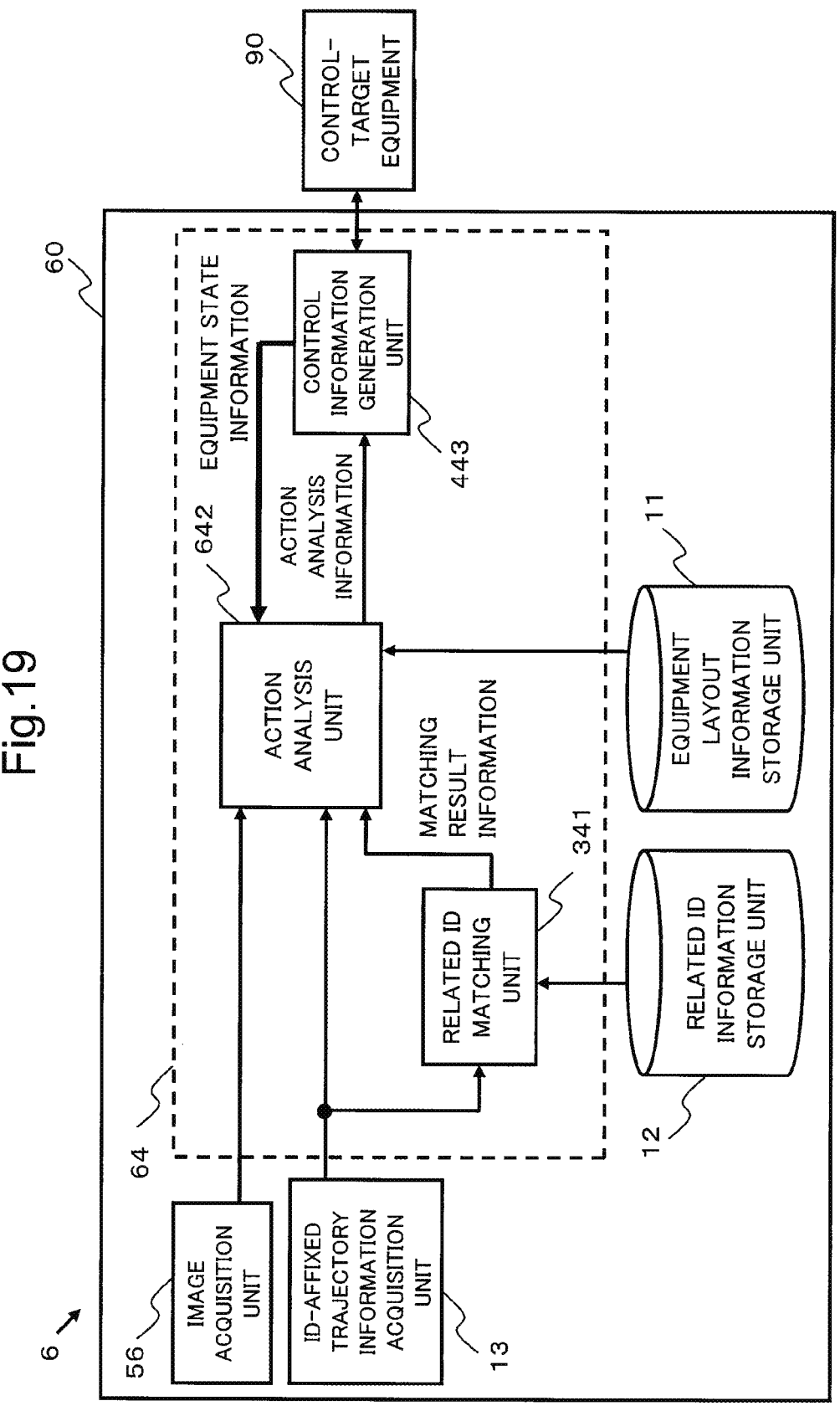
FIG. 19 is a figure showing another mode of the equipment control system of the sixth exemplary embodiment of the present invention.

Further, in the sixth exemplary embodiment of the present invention, as shown in FIG. 19, the equipment control unit 64 may decide the state of the control-target equipment 90 by considering the current equipment state information of the control-target equipment 90. For example, the action analysis unit 642 may change the action pattern dictionary used for the action analysis on the basis of the current equipment state information of the control-target equipment 90 similarly to the action analysis unit 442 in the fourth exemplary embodiment of the present invention.

Further, each exemplary embodiment of the present invention mentioned above can be combined appropriately and executed. For example, each of the third to the sixth exemplary embodiment of the present invention can be applied to the related ID information storage unit 22 and the control-target equipment 91 in the second exemplary embodiment, and can be applied to the control-target equipment 91 of which the appropriate user of the control-target equipment 91 changes dynamically.

For example, a case when the related ID information storage unit 22 and the control-target equipment 91 in the second exemplary embodiment are applied to the equipment control system 6 of the sixth exemplary embodiment of the present invention, and a printer device with authentication function is applied as the control-target equipment 91 will be explained.

In this case, the related ID information storage unit 22 stores the ID of the user of the task which stays in the print queue associated with the printer device with authentication function. The action analysis unit 642 estimates a speed with which the user approaches the printer device with authentication function using an image from the image acquisition unit 56, and calculates arrival prediction time when the user arrives at the printer device with authentication function. Here, it is supposed that the printer device with authentication function needs a recovery time before until ON state from the power saving mode. Then, the control information generation unit 443 adjusts the timing so that the recovery from the power saving mode to ON state will be completed exactly at the arrival prediction time of the user, and outputs control information to the printer device with authentication function. On the basis of this control, the equipment control system which combined the second and the sixth exemplary embodiment of the present invention can control the printer device with authentication function so that the recovery from the power saving mode to ON state will be completed appropriately at the timing when the user who sent the print task to the printer device with authentication function arrives at the printer device with authentication function.

And, in each exemplary embodiment of the present invention mentioned above, operation of the equipment control device 10 to the equipment control device 60 explained with reference to each flow chart may be stored in the storage device 1004 (or storage medium not illustrated) of the computer device as a computer program of the present invention, and the CPU 1001 may read and execute the computer program. In this case, the present invention is structured including a code of the concerned computer program or the storage medium.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2011-104296, filed on May 5, 2011, the disclosure of which is incorporated herein in its entirety by reference.

(Supplementary Note)

The whole or part of the exemplary embodiments disclosed above can be described as, but not limited to, the following supplementary notes.

(Supplementary note 1) An equipment control device includes:

equipment layout information storage means for storing equipment layout information including positional information of control-target equipment which becomes a control target in a space of management target;

related ID information storage means for storing related ID information representing correspondence relationship between the control-target equipment and an ID (identification) given to a user of the control-target equipment;

ID-affixed trajectory information acquisition means for acquiring ID-affixed trajectory information which associates ID of the user with time series of positional information of the user in the space of the management target; and equipment control means for acquiring the control-target equipment concerned which is associated with the ID in the ID-affixed trajectory information on the basis of the related ID information, generating control information for controlling a state of the control-target equipment on the basis of the ID-affixed trajectory information and the equipment layout information, and outputting it to the control-target equipment.

(Supplementary note 2) The equipment control device according to supplementary note 1, wherein the related ID information storage means acquires information representing ID of the user changed dynamically in the control-target equipment from the control-target equipment and updates the related ID information.

(Supplementary note 3) The equipment control device according to supplementary note 1 or supplementary note 2, wherein the equipment control means includes:

related ID matching means for judging whether or not the related ID information including the ID in the ID-affixed trajectory information is stored in the related ID information storage means;

specific area intrusion detection means for deciding a specific area representing an area in which the state of the control-target equipment is changed in accordance with an intrusion situation of the user in the space of management target on the basis of the equipment layout information, and generating specific area intrusion information representing the intrusion situation of the user to the specific area on the basis of the ID-affixed trajectory information and the specific area when the related ID matching means judges that there is the related ID information including the ID in the ID-affixed trajectory information; and control information generation means for generating the control information on the basis of the specific area intrusion information generated by the specific area intrusion detection means.

(Supplementary note 4) The equipment control device according to supplementary note 3, wherein the specific area intrusion detection means deciding a predetermined range based on a position of the control-target equipment in the space of the management target as the specific area.

(Supplementary note 5) The equipment control device according to supplementary note 3, wherein the equipment layout information storage means stores information representing a direction based on a position of the control-target equipment in the space of the management target including the equipment layout information; and the specific area intrusion detection means decides the predetermined range of the direction based on the position of the control-target equipment as the specific area.

(Supplementary note 6) The equipment control device according to supplementary note 3, wherein the equipment layout information storage means stores aisle information representing an aisle area in the space of the management target further included in the equipment layout information; and the specific area intrusion detection means decides the specific area based on a position of the control-target equipment and the aisle information.

(Supplementary note 7) The equipment control device according to supplementary note 3, wherein the equipment layout information storage means stores information representing a use area of the control-target equipment in the space of the management target further included in the equipment layout information; and the specific area intrusion detection means uses the use area included in the equipment layout information as the specific area.

(Supplementary note 8) The equipment control device according to any one of supplementary note 3 to supplementary note 7, wherein the specific area intrusion detection means generates specific area intrusion information representing intrusion to the specific area when the positional information of a predetermined period included in the ID-affixed trajectory information is included in the specific area.

(Supplementary note 9) The equipment control device according to any one of supplementary note 3 to supplementary note 8, wherein the specific area intrusion detection means calculates passing speed when the user crosses a boundary of the specific area on the basis of the ID-affixed trajectory information, and changes an intrusion judgment criterion for judging the intrusion situation on the basis of the passing speed.

(Supplementary note 10) The equipment control device according to any one of supplementary note 3 to supplementary note 9, wherein the specific area intrusion detection means calculates a passing direction on the boundary representing whether the user intrudes inside from outside of the specific area or goes away from inside to outside on the basis of the ID-affixed trajectory information, and changes the intrusion judgment criterion for judging the intrusion situation on the basis of the passing direction.

(Supplementary note 11) The equipment control device according to any one of supplementary note 3 to supplementary note 10, wherein the control information generation means acquires the state of the control-target equipment from the control-target equipment and outputs it to the specific area intrusion detection means; and the specific area intrusion detection means changes the intrusion judgment criterion for judging the intrusion situation on the basis of the state of the control-target equipment.

(Supplementary note 12) The equipment control device according to any one of supplementary note 3 to supplementary note 11, wherein the specific area intrusion detection means further generates a parameter representing a degree of intrusion to the specific area of the user included in the specific area intrusion information on the basis of the ID-affixed trajectory information; and the control information generation means generates the control information on the basis of the parameter.

(Supplementary note 13) The equipment control device according to any one of supplementary note 3 to supplementary note 12, wherein the control information generation means generates the control information on the basis of a number of the specific area intrusion information representing an intrusion of the specific area.

(Supplementary note 14) The equipment control device according to supplementary note 1 or supplementary note 2, wherein the equipment control means includes:

related ID matching means for judging whether or not the related ID information including the ID in the ID-affixed trajectory information is stored in the related ID information storage means;

action analysis means for analyzing the ID-affixed trajectory information and the equipment layout information when the related ID matching means judges that there is the related ID information including the ID in the ID-affixed trajectory information, and acquiring action analysis information representing classification of an action of the user to the control-target equipment; and control information generation means for generating the control information on the basis of the action analysis information.

(Supplementary note 15) The equipment control device according to supplementary note 14, wherein the control information generation means acquires the state of the control-target equipment from the control-target equipment and outputs it to the action analysis means; and the action analysis means changes an action pattern dictionary used for analysis of the ID-affixed trajectory information and the equipment layout information on the basis of the state of the control-target equipment.

(Supplementary note 16) The equipment control device according to any one of supplementary note 1 to supplementary note 15, wherein the equipment control means acquires current equipment state information of the control-target equipment which is associated with the ID in the ID-affixed trajectory information, and generates the control information by considering the current equipment state information.

(Supplementary note 17) The equipment control device according to any one of supplementary note 1 to supplementary note 16, further includes:

image acquisition means for acquiring an image in which the space of the management target is captured, wherein the equipment control means generates the control information by considering the image.

(Supplementary note 18) The equipment control device according to supplementary note 17, wherein the equipment control means acquires information related to a state of the user by analyzing the image, and generates the control information by considering the state of the user.

(Supplementary note 19) The equipment control device according to any one of supplementary note 1 to supplementary note 18, wherein the ID-affixed trajectory information acquisition means includes:

ID specification means for specifying the ID of the user detected in the space of the management target;

trajectory extraction means for calculating a position of the user detected in the space of the management target; and ID trajectory correspondence means for specifying correspondence relationship between the ID specified by the ID specification means and the position calculated by the trajectory extraction means, and generating time series of the positional information for the each ID as the ID-affixed trajectory information.

(Supplementary note 20) An equipment control system includes:

the equipment control device according to any one of supplementary note 1 to supplementary note 19; and a control-target equipment which changes a state on the basis of control information outputted from the equipment control device.

(Supplementary note 21) An equipment control method includes:

acquiring ID-affixed trajectory information which associates ID (identification) of the user with times series of positional information of a user in a space of management target;

acquiring the control-target equipment to which the ID in the ID-affixed trajectory information is related on the basis of control-target equipment which becomes a control target in the space of the management target and related ID information representing correspondence relationship of the ID related to the control-target equipment; and generating control information which controls a state of the related control-target equipment on the basis of equipment layout information including positional information of the control-target equipment in the space of the management target and the ID-affixed trajectory information, and outputting it to the control-target equipment.

(Supplementary note 22) The equipment control method according to supplementary note 21, wherein acquiring information representing the ID of the user changed dynamically in the control-target equipment from the control-target equipment, and updating the related ID information.

(Supplementary note 23) A computer program causing a computer device to execute:

a process of acquiring ID-affixed trajectory information which associates ID (identification) of the user with time series of positional information of a user in a space of management target;

a process of acquiring the control-target equipment to which the ID in the ID-affixed trajectory information is related on the basis of control-target equipment which becomes a control target in the space of the management target and related ID information representing correspondence relationship of the ID related to the control-target equipment; and a process of generating control information which controls a state of the related control-target equipment on the basis of equipment layout information including positional information of the control-target equipment in the space of the management target and the ID-affixed trajectory information, and outputting it to the control-target equipment.

(Supplementary note 24) The computer program according to supplementary note 23 causing a computer device to execute:

a process of acquiring information representing the ID of the user changed dynamically in the control-target equipment from the control-target equipment, and updating the related ID information.

DESCRIPTION OF SYMBOL 1, 2, 3, 4, 5, 6 Equipment control system
10, 20, 30, 40, 50, 60 Equipment control device
11, 31 Equipment layout information storage unit
12, 22 Related ID information storage unit
13 ID-affixed trajectory information acquisition unit
14, 34, 44, 54, 64 Equipment control unit
56 Image acquisition unit
90, 91 Control-target equipment
132 ID specification unit
133 Trajectory extraction unit
134 ID trajectory correspondence unit
341 Related ID matching unit
342 Specific area intrusion detection unit
343, 443, 543 Control information generation unit
442, 642 Action analysis unit
544 Person state judging unit
1001 CPU
1002 RAM
1003 ROM
1004 Storage device
1005 Interface
1006 Sensor equipment

The invention claimed is:

1. An equipment control device comprising:
a controller; and
a memory coupled to the controller,
wherein the memory stores:
   equipment layout information including positional information of control-target equipment which becomes a control target in a space of management target;
   related ID information representing correspondence relationship between the control-target equipment and an ID (identification) given to a user of the control-target equipment;
wherein the controller is configured to:
   acquire ID-affixed trajectory information which associates ID of the user with time series of positional information of the user in the space of the management target;
   acquire the control-target equipment associated with the ID in the ID-affixed trajectory information on the basis of the related ID information,
   generate control information for controlling a state of the control-target equipment on the basis of the ID-affixed trajectory information and the equipment layout information, and outputting it to the control-target equipment;
   determine whether or not the related ID information including the ID in the ID-affixed trajectory information is stored in said memory;
   determine a specific area, representing a positional relationship between the user and the control-target equipment, in which the state of the control-target equipment is changed in accordance with an intrusion situation of the user in the space of management target on the basis of the equipment layout information, and
   generate specific area intrusion information representing the intrusion situation of the user to the specific area on the basis of the ID-affixed trajectory information and the specific area when the related ID information includes the ID in the ID-affixed trajectory information; and generate the control information for controlling the control-target equipment on the basis of the specific area intrusion information that was generated.

2. The equipment control device according to claim 1, wherein the memory stores information representing ID of the user changed dynamically in the control-target equipment from the control-target equipment and updates the related ID information.

3. The equipment control device according to claim 1, wherein the controller is configured to decide a predetermined range based on a position of the control-target equipment in the space of the management target as the specific area.

4. The equipment control device according to claim 1, wherein the memory stores information representing a direction based on a position of the control-target equipment in the space of the management target including the equipment layout information; and wherein the controller is configured to decide the predetermined range of the direction based on the position of the control-target equipment as the specific area.

5. The equipment control device according to claim 1, wherein the memory stores aisle information representing an aisle area in the space of the management target further included in the equipment layout information; and wherein the controller is configured to decide the specific area based on a position of the control-target equipment and the aisle information.

6. The equipment control device according to claim 1, wherein the memory stores information representing a use area of the control-target equipment in the space of the management target further included in the equipment layout information; and wherein the controller is configured to use the use area included in the equipment layout information as the specific area.

7. The equipment control device according to claim 1, wherein the controller is configured to:

generate specific area intrusion information representing intrusion to the specific area when the positional information of a predetermined period included in the ID-affixed trajectory information is included in the specific area.

8. The equipment control device according to claim 1, wherein the controller is configured to:

calculate passing speed when the user crosses a boundary of the specific area on the basis of the ID-affixed trajectory information, and change an intrusion judgment criterion for judging the intrusion situation on the basis of the passing speed.

9. The equipment control device according to claim 1, wherein the controller is configured to:

calculate a passing direction on the boundary representing whether the user intrudes inside from outside of the specific area or goes away from inside to outside on the basis of the ID-affixed trajectory information, and change the intrusion judgment criterion for judging the intrusion situation on the basis of the passing direction.

10. The equipment control device according to claim 1, wherein the controller is configured to:

acquire the state of the control-target equipment from the control-target equipment and output it; and change the intrusion judgment criterion for judging the intrusion situation on the basis of the state of the control-target equipment.

11. The equipment control device according to claim 1, wherein the controller is configured to:

generate a parameter representing a degree of intrusion to the specific area of the user included in the specific area intrusion information on the basis of the ID-affixed trajectory information; and generate the control information on the basis of the parameter.

12. The equipment control device according to claim 1, wherein the controller is configured to:

generate the control information on the basis of a number of the specific area intrusion information representing an intrusion of the specific area.

13. The equipment control device according to claim 1, wherein the controller is configured to:

judge whether or not the related ID information including the ID in the ID-affixed trajectory information is stored;

analyze the ID-affixed trajectory information and the equipment layout information when the controller judges that there is the related ID information including the ID in the ID-affixed trajectory information, and acquire action analysis information representing classification of an action of the user to the control-target equipment; and generate the control information on the basis of the action analysis information.

14. The equipment control device according to claim 13, wherein the controller is configured to:

acquire the state of the control-target equipment from the control-target equipment and outputs it; and change an action pattern dictionary used for analysis of the ID-affixed trajectory information and the equipment layout information on the basis of the state of the control-target equipment.

15. The equipment control device according to claim 1, wherein the controller is configured to:

acquire current equipment state information of the control-target equipment which is associated with the ID in the ID-affixed trajectory information, and generate the control information by considering the current equipment state information.

16. The equipment control device according to claim 1, wherein the controller is configured to:

acquire an image in which the space of the management target is captured, and generate the control information by considering the image.

17. The equipment control device according to claim 16, wherein the controller is configured to:

acquire information related to a state of the user by analyzing the image, and generate the control information by considering the state of the user.

18. A method for equipment control devices, the method comprising:

acquiring ID-affixed trajectory information which associates ID (identification) of a user with times series of positional information of the user in a space of management target;

acquiring a control-target equipment to which the ID in the ID-affixed trajectory information is related on a basis of control-target equipment which becomes a control target in the space of the management target and related ID information representing correspondence relationship of the ID related to the control-target equipment;

generating control information which controls a state of the related control-target equipment on the basis of equipment layout information including positional information of the control-target equipment in the space of the management target and the ID-affixed trajectory information, and outputting it to the control-target equipment;

judging whether or not the related ID information including the ID in the ID-affixed trajectory information is stored;

deciding a specific area, representing a positional relationship between the user and the control-target equipment, in which the state of the control-target equipment is changed in accordance with an intrusion situation of the user in the space of management target on the basis of the equipment layout information, and generating specific area intrusion information representing the intrusion situation of the user to the specific area on the basis of the ID-affixed trajectory information and the specific area when judging that there is the related ID information including the ID in the ID-affixed trajectory information; and generating the control information on the basis of the specific area intrusion information.

19. A non-transitory computer readable storage medium storing a program, said program causing an equipment control device to perform a method, said method comprising:

acquiring ID-affixed trajectory information which associates ID (identification) of a user with time series of positional information of the user in a space of management target;

acquiring a control-target equipment to which the ID in the ID-affixed trajectory information is related on a basis of control-target equipment which becomes a control target in the space of the management target and related ID information representing correspondence relationship of the ID related to the control-target equipment;

generating control information which controls a state of the related control-target equipment on the basis of equipment layout information including positional information of the control-target equipment in the space of the management target and the ID-affixed trajectory information, and outputting it to the control-target equipment;

judging whether or not the related ID information including the ID in the ID-affixed trajectory information is stored;

deciding a specific area, representing a positional relationship between the user and the control-target equipment, in which the state of the control-target equipment is changed in accordance with an intrusion situation of the user in the space of management target on the basis of the equipment layout information, and generating specific area intrusion information representing the intrusion situation of the user to the specific area on the basis of the ID-affixed trajectory information and the specific area when judging that there is the related ID information including the ID in the ID-affixed trajectory information; and generating the control information on the basis of the specific area intrusion information.

\* \* \* \* \*